United States Patent
Kitamura et al.

(10) Patent No.: US 8,168,739 B2
(45) Date of Patent: May 1, 2012

(54) POLYSILOXANE, METHOD FOR PRODUCING THE SAME, AND METHOD FOR PRODUCING CURED PRODUCT OF THE SAME

(75) Inventors: Akinori Kitamura, Tsukuba (JP); Hiroshi Suzuki, Tokyo (JP)

(73) Assignee: Toagosei Co., Ltd., Tokyo (JP)

( * ) Notice: Subject to any disclaimer, the term of this patent is extended or adjusted under 35 U.S.C. 154(b) by 71 days.

(21) Appl. No.: 12/741,462

(22) PCT Filed: Nov. 13, 2008

(86) PCT No.: PCT/JP2008/070697
§ 371 (c)(1),
(2), (4) Date: Jul. 14, 2010

(87) PCT Pub. No.: WO2009/066608
PCT Pub. Date: May 28, 2009

(65) Prior Publication Data
US 2010/0280210 A1    Nov. 4, 2010

(30) Foreign Application Priority Data

Nov. 19, 2007   (JP) ................................. 2007-299197

(51) Int. Cl.
*C08G 77/04* (2006.01)
*C08G 77/12* (2006.01)
*C08G 77/20* (2006.01)

(52) U.S. Cl. .......................................... 528/31; 528/32

(58) Field of Classification Search .................. None
See application file for complete search history.

(56) References Cited

U.S. PATENT DOCUMENTS

| | | | |
|---|---|---|---|
| 4,339,564 A * | 7/1982 | Okamura | 528/15 |
| 4,855,381 A * | 8/1989 | Mutoh et al. | 528/23 |
| 4,946,921 A * | 8/1990 | Shirahata et al. | 528/39 |
| 5,162,480 A * | 11/1992 | Schilling et al. | 528/23 |
| 5,434,234 A | 7/1995 | Stepp et al. | |
| 5,753,751 A * | 5/1998 | Liao et al. | 524/837 |
| 5,859,162 A | 1/1999 | Yamamoto et al. | |
| 5,965,683 A * | 10/1999 | Nye et al. | 528/31 |
| 6,258,913 B1 * | 7/2001 | Herzig et al. | 528/15 |
| 6,399,733 B1 | 6/2002 | Yamamoto et al. | |
| 6,596,404 B1 * | 7/2003 | Albaugh et al. | 428/447 |
| 7,241,835 B2 * | 7/2007 | O'Brien et al. | 524/862 |
| 7,612,222 B2 * | 11/2009 | Wood | 556/460 |
| 2006/0081864 A1 | 4/2006 | Nakazawa | |
| 2007/0134424 A1 | 6/2007 | Tauchi et al. | |

FOREIGN PATENT DOCUMENTS

| | | |
|---|---|---|
| JP | 6 501286 | 2/1994 |
| JP | 6 128378 | 5/1994 |
| JP | 6 329687 | 11/1994 |
| JP | 8 245792 | 9/1996 |
| JP | 2001 288267 | 10/2001 |
| JP | 2004 359756 | 12/2004 |
| JP | 2005 010077 | 2/2005 |

OTHER PUBLICATIONS

U.S. Appl. No. 12/812,808, filed Nov. 8, 2010, Ooike, et al.
U.S. Appl. No. 12/989,331, filed Oct. 22, 2010, Ooike, et al.
Office Action issued in Chinese Patent Application No. 200880115007.0 dated Jan. 4, 2012 (w/English translation).

* cited by examiner

*Primary Examiner* — Robert Loewe
(74) *Attorney, Agent, or Firm* — Oblon, Spivak, McClelland, Maier & Neustadt, L.L.P.

(57) ABSTRACT

The present invention has an object to provide a polysiloxane which is a liquid substance having low viscosity, is excellent in curing workability, and has excellent heat resistance in an obtained cured material, and to a production method of a cured material using the polysiloxane. Specifically disclosed is a polysiloxane which is obtained by hydrolysis and polycondensation of a silicon compound having three hydrolyzable groups, a silicon compound having two hydrolyzable groups and a silicon compound having one hydrolyzable group, and is characterized by containing a hydrosilylatable carbon-carbon unsaturated group, a hydrosilyl group and an alkoxysilyl group, and having a number average molecular weight of 500 to 20,000.

9 Claims, No Drawings

POLYSILOXANE, METHOD FOR PRODUCING THE SAME, AND METHOD FOR PRODUCING CURED PRODUCT OF THE SAME

FIELD OF THE INVENTION

The present invention relates to a polysiloxane having a hydrosilylatable carbon-carbon unsaturated group and a hydrosilyl group. Additionally, the invention relates to a production method of the polysiloxane. Further, the invention relates to a production method of a cured material of the polysiloxane. The cured material of the polysiloxane is useful for a heat-resistant material°

BACKGROUND ART

Polysiloxane having a hydrosilylatable carbon-carbon unsaturated group and a hydrosilyl group is known (See, Patent Documents 1 to 4). Even if the conventional polysiloxane has low viscosity of, for example, 30,000 mPa·s or lower at a temperature of 25° C., the cured material thereof has a 5% weight loss temperature of as low as 900° C., and the temperature does not exceed 1,000° C., having not sufficient heat resistance. Therefore, no such polysiloxane is known that is a liquid substance having low viscosity and that has high heat resistance in an obtained cured material.

[Patent Document 1] JP-A H06-128378

[Patent Document 2] JP-A H08-245792

[Patent Document 3] JP-A 2001-288267

[Patent Document 4] WO 2005/010077

DISCLOSURE OF THE INVENTION

Problems that the Invention is to Solve

The present invention has an object to provide a polysiloxane which is a liquid substance having low viscosity, is excellent in curing workability, and has excellent heat resistance in an obtained cured material. Additionally, the invention has an object to a production method of a cured material using the polysiloxane.

Means for Solving the Problems

The above-mentioned problems are solved and the present invention is as follows.

1. A polysiloxane obtained by conducting a hydrolysis and polycondensation reaction of a silicon compound (T) having three hydrolyzable groups, a silicon compound (D) having two hydrolyzable groups, and a silicon compound (M) having one hydrolyzable group, characterized in that at least one compound of the silicon compound (T), the silicon compound (D), and the silicon compound (M) has a hydrosilyl group, at least one compound of the silicon compound (T), the silicon compound (D), and the silicon compound (M) has a hydrosilylatable carbon-carbon unsaturated group, and the polysiloxane has a hydrosilylatable carbon-carbon unsaturated group, a hydrosilyl group and an alkoxysilyl group, and has a number average molecular weight of 500 to 20,000.

2. The polysiloxane according to claim 1, comprising a unit represented by the following general formula (1).

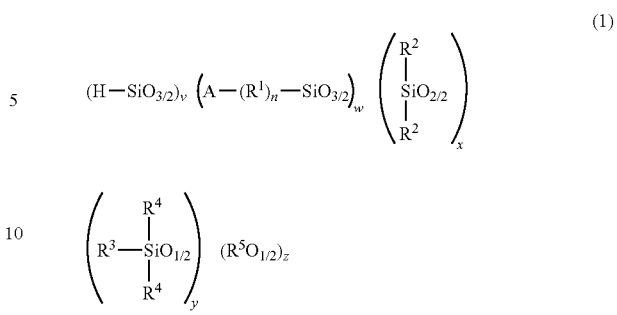

[In the formula, A is an organic group having 2 to 10 carbon atoms containing a hydrosilylatable carbon-carbon unsaturated group, $R^1$ is an alkylene group having 1 to 20 carbon atoms, a divalent aromatic group having 6 to 20 carbon atoms or a divalent alicyclic group having 3 to 20 carbon atoms, n is 0 or 1, R is a hydrogen atom, an alkyl group having 1 to 10 carbon atoms or an organic group having 2 to 10 carbon atoms containing a hydrosilylatable carbon-carbon unsaturated group ($R^2$s in one molecule may be the same or different), $R^3$ is a hydrogen atom or an organic group having 2 to 10 carbon atoms containing a hydrosilylatable carbon-carbon unsaturated group, $R^4$ is a hydrogen atom, an alkyl group having 1 to 10 carbon atoms or an organic group having 2 to 10 carbon atoms containing a hydrosilylatable carbon-carbon unsaturated group ($R^4$s in one molecule may be the same or different), $R^5$ is an alkyl group having 1 to 6 carbon atoms, v, x, y and z are positive numbers, w is zero or a positive number, they have relationships of $0.001 \leq x/(v+w) \leq 2$, $0.01 \leq y/(v+w) \leq 2$, and $0.01 \leq z/(v+w+x+y) \leq 1$. However, when w is zero, at least one of $R^2$, $R^3$ and $R^4$ is an organic group having 2 to 10 carbon atoms containing a hydrosilylatable carbon-carbon unsaturated group.]

3. A method for the production of the polysiloxane according to claim 1 or 2, characterized in that the method comprises a first process for conducting a hydrolysis and polycondensation reaction of a silicon compound (T) having three hydrolyzable groups, a silicon compound (D) having two hydrolyzable groups, and a silicon compound (M) having one hydrolyzable group in the presence or absence of an organic solvent, at least one compound of the silicon compound (T), the silicon compound (D), and the silicon compound (M) has a hydrosilyl group, and at least one compound of the silicon compound (T), the silicon compound (D), and the silicon compound (M) has a hydrosilylatable carbon-carbon unsaturated group.

4. The method for the production of the polysiloxane according to claim 3, wherein the hydrolyzable group in the silicon compound (T) is an alkoxy group, wherein the hydrolyzable group in the silicon compound (D) is an alkoxy group, and wherein the hydrolyzable group in the silicon compound (M) is an alkoxy group or a siloxy group.

5. The method for the production of the polysiloxane according to claim 3 or 4, wherein the method comprises a second process for distilling water in the presence of an aromatic hydrocarbon having a boiling point of 90° C. or higher after the first process.

6. The method for the production of the polysiloxane according to any one of claims 3 to 5, wherein the polysiloxane comprises a unit represented by the following unit (2).

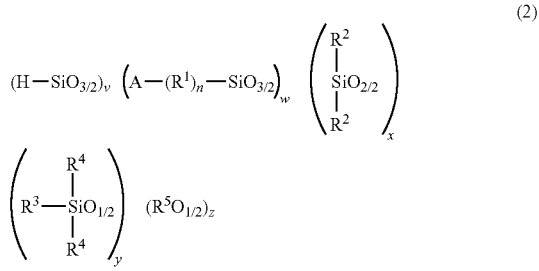

(2)

[In the formula, A is an organic group having 2 to 10 carbon atoms containing a hydrosilylatable carbon-carbon unsaturated group, $R^1$ is an alkylene group having 1 to 20 carbon atoms, a divalent aromatic group having 6 to 20 carbon atoms or a divalent alicyclic group having 3 to 20 carbon atoms, n is 0 or 1, $R^2$ is a hydrogen atom, an alkyl group having 1 to 10 carbon atoms or an organic group having 2 to 10 carbon atoms containing a hydrosilylatable carbon-carbon unsaturated group ($R^2$s in one molecule may be the same or different), $R^3$ is a hydrogen atom or an organic group having 2 to 10 carbon atoms containing a hydrosilylatable carbon-carbon unsaturated group, $R^4$ is a hydrogen atom, an alkyl group having 1 to 10 carbon atoms or an organic group having 2 to 10 carbon atoms containing a hydrosilylatable carbon-carbon unsaturated group ($R^4$s in one molecule may be the same or different), $R^5$ is an alkyl group having 1 to 6 carbon atoms, v, x, y and z are positive numbers, w is zero or a positive number, they have relationships of $0.001 \leq x/(v+w) \leq 2$, $0.01 \leq y/(v+w) \leq 2$, and $0.01 \leq z/(v+w+x+y) \leq 1$. However, when w is zero, at least one of $R^2$, $R^3$ and $R^4$ is an organic group having 2 to 10 carbon atoms containing a hydrosilylatable carbon-carbon unsaturated group.]

7. A method for the production of a cured material of polysiloxane, characterized by comprising a process for heating the polysiloxane according to claim 1 or 2 at a temperature range from 150° C. to 700° C. in the absence of a catalyst for hydrosilylation reaction.

8. A method for the production of a cured material of polysiloxane, characterized by comprising a process for heating the polysiloxane according to claim 1 or 2 at a temperature of 50° C. or higher and lower than 150° C. in the absence of a catalyst for hydrosilylation reaction, and a process for heating at a temperature range from 150° C. to 700° C., sequentially.

Effect of the Invention

Since the polysiloxane of the present invention has a low viscosity of 30,000 mPa·s or less at 25° C., the polysioloxane can be cured without a catalyst. In addition, since the 5% weight loss temperature of the obtained cured material is 1,000° C. or higher, heat resistance is excellent, and a favorable film without a crack can be obtained.

According to the production method of the polysiloxane, a polysiloxane having the above-mentioned excellent properties can be effectively produced.

Additionally, according to the production method of the cured material of the polysiloxane, a cured material excellent in heat resistance can be effectively produced without a catalyst.

BEST MODE FOR CARRYING OUT THE INVENTION

The polysiloxane of the present invention is a compound that has a hydrosilylatable carbon-carbon unsaturated group, a hydrosilyl group (a group containing Si—H bond) and an alkoxysilyl group, and has a number-average molecular weight of 500 to 20,000, and that is obtained by conducting a hydrolysis and polycondensation reaction of a silicon compound (T) having three hydrolyzable groups, a silicon compound (D) having two hydrolyzable groups, and a silicon compound (M) having one hydrolyzable group. The polysiloxane of the present invention is a compound that has a silsesquioxane unit (hereinafter referred to as a "structural unit T") deriving from the silicon compounds (T), (D) and (M), a silicone unit (hereinafter referred to as a "structural unit D"), and a monofunctional siloxane unit (hereinafter referred to as a "structural unit M").

At least one compound of the silicon compound (T), the silicon compound (D), and the silicon compound (M) has a hydrosilyl group among the silicon compounds (T), (D) and (M), and at least one compound of the silicon compound (T), the silicon compound (D), and the silicon compound (M) has a hydrosilylatable carbon-carbon unsaturated group. This unsaturated group usually binds to a silicon atom and is an organic group having carbon atoms of 2 to 10 containing a double bond or a triple bond. Specific examples of the unsaturated group include a vinyl group, an ortho styryl group, a meta styryl group, a para styryl group, an acryloyl group, a methacryloyl group, an acryloxy group, a methacryloxy group, a 1-propenyl group, a 1-butenyl group, a 1-pentenyl group, a 3-methyl-1-butenyl group, a phenylethenyl group, an ethynyl group, a 1-propynyl group, a 1-butynyl group, a 1-pentinyl group, a 3-methyl-1-butynyl group, a phenylbutynyl group and the like. The silicon compound having the unsaturated group may have only one unsaturated group or two or more unsaturated groups. In the case where the compound has two or more unsaturated groups, the unsaturated groups may be the same or different from each other. Additionally, the two or more unsaturated groups may be bound to the same silicon atom or to a plurality of silicon atoms. It is noted that when a polysiloxane obtained using a silicon compound in which the unsaturated group is bound to the same silicon atom is subjected to curing, an unreacted vinyl group may easily remain due to steric hindrance, and heat resistance might become insufficient. Therefore, the silicon compound having the unsaturated group is preferably a compound in which one unsaturated group is bound to one silicon atom.

The hydrolyzable group in the above silicon compounds (T), (D) and (M) is a functional group or an atom that is bound to a silicon atom and is capable of generating a silanol group by hydrolysis reaction. Examples of the hydrolyzable group include an alkoxy group, a siloxy group and a halogen atom. Methoxy group, ethoxy group, propoxy group, siloxy group and a chlorine atom are favorable hydrolysis groups since their raw materials can be easily obtained and reactivity is excellent. Methoxy group, ethoxy group and siloxy group are particularly preferred as the hydrolyzable group.

In the case where the silicon compound has a hydroxyl group and the hydroxyl group binds to a silicon atom, a silanol group is formed from the beginning, and this hydroxyl group is not a functional group that can generate a silanol group by hydrolysis reaction. However, in the present invention, the silicon compound having a hydroxyl group is handled equally to the one obtained by hydrolyzing a silicon compound having a hydrolysis group (before polycondensation).

The silicon compound (T) having three hydrolyzable groups is a component that introduces the structural unit T (silsesquioxane unit) as a structural unit of a polysiloxane generated by hydrolysis and polycondensation reaction. The silicon compound (T) is preferably a compound that contains one silicon atom and in which three hydrolyzable groups are bound to the silicon atom. The silicon compound (T) is an important component for imparting excellent heat resistance to the polysiloxane cured material.

Examples of the silicon compound (T) include a silicon compound having a hydrosilyl group (hereinafter referred to as "silicon compound (TH)"), a silicon compound having a hydrosilylatable carbon-carbon unsaturated group (hereinafter referred to as "silicon compound (TU)") and the like. These compounds may be used singly or in combination of two or more types thereof.

Examples of the silicon compound (TH) include trimethoxysilane, triethoxysilane, tripropoxysilane, trichlorosilane and the like.

Examples of the silicon compound (TU) include a silicon compound having a vinyl group represented by trimethoxyvinylsilane, triethoxyvinylsilane, tripropoxyvinylsilane, trichlorovinylsilane, trimethoxy(4-vinylphenyl)silane, triethoxy(4-vinylphenyl)silane, tripropoxy(4-vinylphenyl)silane, and trichloro(4-vinylphenyl)silane; a silicon compound having an unsaturated group such as ethynyl group acryloyl group and methacryloyl group; and the like.

Examples of the silicon compound (T) other than the silicon compound (TH) and the silicon compound (TU) (hereinafter referred to as "silicon compound (TO)") include a trimethoxyalkylsilane, a triethoxyalkylsilane, a tripropoxyalkylsilane, a trichloroalkylsilane, trimethoxyphenylsilane, triethoxyphenylsilane, tripropoxyphenylsilane, trichlorophenylsilane, a trialkoxysilane in which an alkyl group or phenyl group binding to a silicon atom is substituted by a group or an atom other than a hydrosilylatable carbon-carbon unsaturated group in these compound, and the like.

The above silicon compound (T) preferably contains the silicon compound (TH) since it can lead to a cured material with extremely excellent heat resistance.

The silicon compound (D) having two hydrolysis groups is a component that introduces the structural unit D (silicone unit) as a structural unit of a polysiloxane generated by hydrolysis and polycondensation reaction. The silicon compound (D) is preferably a compound that contains one silicon atom and in which two hydrolysis groups are bound to the silicon atom. The silicon compound (D) is an important component to keep viscosity of the polysiloxane low and to form a favorable film for a polysiloxane cured material.

Examples of the silicon compound (D) include a silicon compound having a hydrosilyl group (hereinafter referred to as "silicon compound (DH)"), a silicon compound having a hydrosilylatable carbon-carbon unsaturated group (hereinafter referred to as "silicon compound (DU)"), and the like. These compounds may be used singly or in combination of two or more types thereof.

Examples of the silicon compound (DH) include dimethoxymethylsilane, diethoxymethylsilane, dipropoxymethylsilane, dichloromethylsilane and the like.

Examples of the silicon compound (DU) include a silicon compound having an unsaturated group such as vinyl group, ethynyl group, acryloyl group and methacryloyl group.

Examples of the silicon compound (D) other than the silicon compound (DH) and the silicon compound (DU) (hereinafter referred to as "silicon compound (DO)") include a dimethoxydialkylsilane, a diethoxydialkylsilane, a dipropoxydialkylsilane, a dichlorodialkylsilane, dimethoxydiphenylsilane, diethoxydiphenylsilane, dipropoxydiphenylsilane, dichlorodiphenylsilane, a dialkoxysilane in which an alkyl group or phenyl group binding to a silicon atom is substituted by a group or an atom other than a hydrosilylatable carbon-carbon unsaturated group in these compound, and the like.

The silicon compound (M) having one hydrolysis group is a component that introduces the structural unit M (monofunctional siloxane structural unit) as a structural unit of a polysiloxane generated by hydrolysis and polycondensation reaction. The silicon compound (M) is an important component to keep viscosity of the polysiloxane low and to form a favorable film by curing polysiloxane.

The silicon compound (M) may be a silicon compound (hereinafter referred to as "silicon monomer (M1)") that contains one silicon atom and in which one hydrolysis group is bound to the silicon atom or a silicon compound (hereinafter referred to as "silicon dimer (M2)") having a structure in which two silicon monomers (M1) are hydrolyzed and condensed to one molecule. In the case where the silicon compound (M) is the silicon dimer (M2), two structural units M can be formed using one molecule of the silicon compound (M).

Examples of the silicon compound (M) include a silicon compound having a hydrosilyl group (hereinafter referred to as "silicon compound (MH)"), a silicon compound having a hydrosilylatable carbon-carbon unsaturated group (hereinafter referred to as "silicon compound (MU)"), and the like. These compounds may be used singly or in combination of two or more types thereof.

Examples of the silicon compound (MH) include methoxydimethylsilane, ethoxydimethylsilane, propoxydimethylsilane, chlorodimethylsilane, 1,1,3,3-tetramethyldisiloxane and the like. Among these compounds exemplified above, 1,1,3,3-tetramethyldisiloxane is a silicon dimer (M2), while the others are silicon dimers (M1).

Examples of the silicon compound (MU) include methoxyvinyldimethylsilane, ethoxyvinyldimethylsilane, propoxyvinyldimethylsilane, chlorovinyldimethylsilane, 1,3-divinyltetramethyldisiloxane and the like. Among these compounds exemplified above, 1,3-divinyltetramethyldisiloxane is a silicon dimer (M2), while the others are silicon monomers (M1).

If a silicon compound other than the silicon compound (MH) and the silicon compound (MU) is used, the obtained polysiloxane cured material tends to have lower heat resistance. Therefore, the compound preferably is not used.

The amounts of the silicon compound (T), the silicon compound (D), and the silicon compound (M) used in the hydrolysis and polycondensation reaction are, respectively, preferably 30% to 80% by mol, 1% to 30% by mol, and 5% to 50% by mol, more preferably 40% to 75% by mol, 2% to 25% by mol, and 10% to 45% by mol, and further preferably 50% to 70% by mol, 2% to 20% by mol, and 15% to 40% by mol based on the total amount of the silicon compound (T), the silicon compound (D), and the silicon compound (M). It is noted that in the case where the silicon compound (M) contains the silicon dimer (M2), a ratio obtained by converting a usage of the silicon dimer (M2) to a usage of the silicon monomer (M1) is applied to the ratio of the silicon compound (M). For example, 1 mol of the silicon dimer (M2) corresponds to 2 mol of the silicon compound (M). The same applies to the rest of the description of the present invention.

In the case where the silicon dimer (M2) having a structure in which two silicon monomers (M1) are condensed is used as the silicon compound (M) such as 1,1,3,3-tetramethyldisiloxane and 1,3-diviyltetramethyldisiloxane, 1 mol of the silicon dimer (M2) corresponds to 2 mol of the silicon monomer (M1), as mentioned above. However, the silicon dimer (M2) has hydrolysis reactivity slightly smaller and almost half of it is not consumed but remains unreacted depending on a reaction condition, and the charging amount needs to be larger than the ratio presuming stoichiometric reaction.

When the silicon monomer (M1), the silicon compound (T) and the silicon compound (D) are used in the above ratio, they are reacted substantially stoichiometrically, and a substantially full amount offered for the reaction (naturally excluding elimination groups) is taken into a polysiloxane.

When the formulating amount of the silicon compound (T) is too small, an obtained polysiloxane cured material tends to have lower heat resistance. On the other hand, when the amount is too large, an obtained polysiloxane may have too high viscosity or a film obtained by curing the polysiloxane may have cracks easily.

When the formulating amount of the silicon compound (D) is too small, an obtained polysiloxane may have high viscosity or a film obtained by curing the polysiloxane may have cracks easily. On the other hand, when the amount is too large, an obtained polysiloxane cured material tends to have lower heat resistance.

When the formulating amount of the silicon compound (M) is too small, an obtained polysiloxane may have high viscosity or a film obtained by curing the polysiloxane may have cracks easily. On the other hand, when the amount is too large, an obtained polysiloxane cured material tends to have lower heat resistance.

As mentioned above, the silicon compound (TH) in the silicon compound (T) is the most important component to have a polysiloxane cured material having high heat resistance. The amount of the silicon compound (TH) used in the hydrolysis and polycondensation reaction is preferably in the range from 30% to 80% by mol, more preferably from 35% to 75% by mol, and further preferably from 40% to 70% by mol based on the total amount of the silicon compound (T), the silicon compound (D) and the silicon compound (M).

The polysiloxane of the present invention has a hydrosilylatable carbon-carbon unsaturated group, a hydrosilyl group and an alkoxysilyl group in its molecule. When the polysiloxane of the present invention is heated, the hydrosilylatable carbon-carbon unsaturated group contained in one polysiloxane and the hydrosilyl group contained in another polysiloxane are hydrosilylated to form a cured material having excellent heat resistance.

In the polysiloxane of the present invention, the number of hydrosilyl groups contained in one molecule on an average is preferably 1 to 10 times of the number of the hydrosilylatable carbon-carbon unsaturated groups, more preferably 2 to 9 times thereof, further preferably 3 to 8 times thereof, and particularly 4 to 7 times thereof. If the carbon-carbon unsaturated group remains unreacted when the polysiloxane is cured by hydrosilylation reaction, the cured material might have insufficient heat resistance. Therefore, the quantity of the hydrosilyl group is made excessive in relation to the quantity of the carbon-carbon unsaturated group.

Additionally, the ratio of the hydrosilyl group should not be excessive more than necessary. For example, a polysiloxane containing a large amount of hydrosilyl group deriving from the silicon compound (TH) might turn into a gel or have high viscosity. In a polysiloxane containing the hydrosilyl group deriving from the silicon compound (MH), if a large amount of the hydrosilyl group deriving from the silicon compound (MH) remains being unreacted, the obtained cured material might have insufficient heat resistance.

The alkoxysilyl group is not particularly limited and is usually an alkoxysilyl group having carbon atoms of 1 to 6. From the viewpoint of a balance between stability of the polysiloxane and reactivity when polysiloxane is cured, ethoxysilyl group, n-propoxysilyl group and isopropoxysilyl group are particularly preferable.

Additionally, a compound deriving the alkoxysilyl group contained in the polysiloxane of the present invention is not particularly limited. The alkoxysilyl group may be an unreacted alkoxysilyl group deriving from the above-mentioned silicon compound. Further, when an alcohol is used as a solvent for hydrolysis and polycondensation reaction, the alcohol can form the alkoxysilyl group through reaction with the silicon compound or the like. The alkoxysilyl group generated by the alcohol may be used. As the alkoxy group containing the alkoxysilyl group, ethoxy group, n-propoxy group and isopropoxy group are preferable from the viewpoint of a balance between stability of the polysiloxane and reactivity when polysiloxane is cured. Among these, isopropoxy group is particularly preferable.

Since the polysiloxane of the present invention has an alkoxysilyl group, options in curing conditions of the polysiloxane can be widened, and excellent curing workability can be obtained. For example, in the case where the polysiloxane is partially cured at a low temperature lower than 150° C. and then, cured at a high temperature at 150° C. or higher and 700° C. or lower, handling of samples in the preceding stage is facilitated.

The polysiloxane of the present invention contains at least the following structural units (i) and (ii) due to reaction of the silicon compounds (T), (D) and (M). And the polysiloxane of the present invention may contain the following structural unit (iii) as another structural unit. The alkoxysilyl group in the polysiloxane of the present invention is contained in any of the following structural units:

Structural unit (i) that is a unit having a hydrosilyl group;

Structural unit (ii) that is a unit having a hydrosilylatable carbon-carbon unsaturated group; and Structural unit (iii) that is a unit not having a hydrosilyl group and a hydrosilylatable carbon-carbon unsaturated group.

In order to impart excellent heat resistance to an obtained cured material, the total number of the structural units (i) and (ii) in the polysiloxane is preferably 70% or more, more preferably 80% or more, further preferably 85% or more, and particularly 90% or more based on the total number of the structural units (i), (ii), and (iii).

As the structural unit (i), the following three types are exemplified. The polysiloxane of the present invention may contain one kind of these structural units or may contain two or three types. In the case where a plurality of the structural units are contained, they may be the same or may be different from each other.

(HSiO$_{3/2}$)

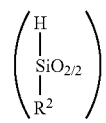

[R$^2$ is a hydrogen atom or an alkyl group having carbon atoms of 1 to 10.]

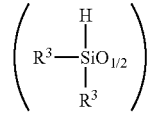

[$R^3$ is a hydrogen atom or an alkyl group having carbon atoms of 1 to 10. However, if two $R^3$s are alkyl groups having carbon atoms of 1 to 10, these $R^3$s pieces may be the same or may be different from each other.]

The polysiloxane of the present invention is one containing preferably 5 to 100 units of $(HSiO_{3/2})$, more preferably 6 to 80 units thereof, further preferably 7 to 60 units thereof, and particularly 8 to 40 units thereof in one molecule on an average. If the number of the units $(HSiO_{3/2})$ is too small, a polysiloxane cured material tends to be one having inferior heat resistance. On the other hand, if the number of the units $(HSiO_{3/2})$ is too large, polysiloxane may have high viscosity and become difficult to be handled.

As the structural unit (ii), the following three types are exemplified. The polysiloxane of the present invention may contain one kind of these structural units or may contain two or three types. In the case where a plurality of the structural units are contained, they may be the same or may be different from each other.

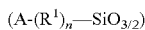

[In the formula, A is an organic group having carbon atoms of 2 to 10 containing a hydrosilylatable carbon-carbon unsaturated group, and $R^1$ is an alkylene group having carbon atoms of 1 to 20, a divalent aromatic group having carbon atoms of 6 to 20, or a divalent alicyclic group having carbon atoms of 3 to 20. n is 0 or 1.]

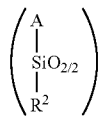

[In the formula, A is an organic group having carbon atoms of 2 to 10 containing a hydrosilylatable carbon-carbon unsaturated group, and $R^2$ is an alkyl group having carbon atoms of 1 to 10, or an organic group having carbon atoms of 2 to 10 containing a hydrosilylatable carbon-carbon unsaturated group. If $R^2$ is an organic group having carbon atoms of 2 to 10 containing a hydrosilylatable carbon-carbon unsaturated group, $R^2$ and A may be the same or different from each other.]

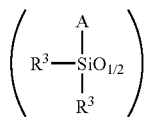

[In the formula, A is an organic group having carbon atoms of 2 to 10 having a hydrosilylatable carbon-carbon unsaturated group, and $R^3$ is an alkyl group having carbon atoms of 1 to 10, or an organic group having carbon atoms of 2 to 10 containing a hydrosilylatable carbon-carbon unsaturated group. However, if two $R^3$s are alkyl groups having carbon atoms of 1 to 10, $R^3$s may be the same or different from each other. If two $R^3$s are organic groups having carbon atoms of 2 to 10 containing a hydrosilylatable carbon-carbon unsaturated group, $R^3$ and A may be the same, different from each other. Any two may be the same.]

Moreover, as the structural unit (iii), the following two types are exemplified. The polysiloxane of the present invention may contain one kind of these structural units or may contain two or three types. In the case where a plurality of the structural units are contained, they may be the same or may be different.

[In the formula, $R^5$ is an alkyl group having carbon atoms of 1 to 6.]

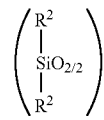

[In the formula, $R^2$ is the same or different from each other and is an alkyl group having carbon atoms of 1 to 10.]

The oxygen atom in the former structural unit is bound to a silicon atom in any of the structural units exemplified as the structural units (i) and (ii) and forms an alkoxysilyl group.

The alkoxysilyl group in the polysiloxane of the present invention is preferably one deriving from a structural unit of the former.

Additionally, a ratio of the number of the alkoxysilyl group in the polysiloxane of the present invention is preferably 1% to 100%, more preferably 2% to 30%, further preferably 3% to 20%, and particularly 4% to 10% based on the total number of the alkoxysilyl group in the structural units (i), (ii) and (iii). In the case where the alkoxysilyl group contains an isopropoxysilyl group, the ratio of the isopropoxysilyl group (a ratio of the number of the group) is preferably 50% or more, more preferably 60% or more, and further preferably 70% or more.

As mentioned above, presence of the alkoxysilyl group in an adequate amount in the polysiloxane of the present invention makes curing workability of the polysiloxane favorable. If the amount of the alkoxysilyl group is too small, the above effect is not fully exerted, while if the alkoxysilyl group is too large, the polysiloxane tends to have lower stability.

The polysiloxane of the present invention may have a functional group other than the above in the structural units (i), (ii) and (iii). For example, a silanol group may be provided, or a halogenosilyl group such as SiCl may be provided depending on the type of a raw material for manufacture. The ratio of the total number of the silanol group and the halogenosilyl group in the polysiloxane is preferably 10% or less, more preferably 5% or less, further preferably 3% or less, and particularly 1% or less based on the total number of the other group in the structural units (i), (ii) and (iii). If the ratio of the silanol group or the halogenosilyl group is too large, the polysiloxane can easily have lower stability.

The polysiloxane of the present invention is preferably a polysiloxane containing the following structural unit represented by the general formula (1).

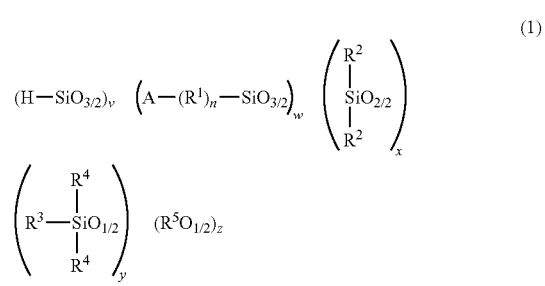

(1)

[In the formula, A is an organic group having 2 to 10 carbon atoms containing a hydrosilylatable carbon-carbon unsaturated group, $R^1$ is an alkylene group having 1 to 20 carbon atoms, a divalent aromatic group having 6 to 20 carbon atoms or a divalent alicyclic group having 3 to 20 carbon atoms, n is 0 or 1, $R^2$ is a hydrogen atom, an alkyl group having 1 to 10 carbon atoms or an organic group having 2 to 10 carbon atoms containing a hydrosilylatable carbon-carbon unsaturated group ($R^2$s in one molecule may be the same or different), $R^3$ is a hydrogen atom or an organic group having 2 to 10 carbon atoms containing a hydrosilylatable carbon-carbon unsaturated group, $R^4$ is a hydrogen atom, an alkyl group having 1 to 10 carbon atoms or an organic group having 2 to 10 carbon atoms containing a hydrosilylatable carbon-carbon unsaturated group ($R^4$s in one molecule may be the same or different), $R^5$ is an alkyl group having 1 to 6 carbon atoms, v, x, y and z are positive numbers, w is zero or a positive number, they have relationships of $0.001 \leq x/(v+w) \leq 2$, $0.01 \leq y/(v+w) \leq 2$, and $0.01 \leq z/(v+w+x+y) \leq 1$. However, when w is zero, at least one of $R^2$, $R^3$ and $R^4$ is an organic group having 2 to 10 carbon atoms containing a hydrosilylatable carbon-carbon unsaturated group.]

In the general formula (1) above, each of v, w, x, y and z is an average value of a ratio of the number of the structural unit contained in one molecule of the polysiloxane. Each of v, x, y and z is a positive number, and w is zero or a positive number.

In the general formula (1) above, v is preferably in the range from 5 to 100, more preferably from 6 to 80, further preferably from 7 to 60, and particularly from 8 to 40.

In the general formula (1) above, A is an organic group having carbon atoms of 2 to 10 containing a hydrosilylatable carbon-carbon unsaturated bond. This organic group A is not particularly limited so long as it is a functional group having a hydrosilylatable carbon-carbon double bond or a triple bond. Specific examples include a vinyl group, an ortho styryl group, a meta styryl group, a para styryl group, an acryloyl group, a methacryloyl group, an acryloxy group, a methacryloxy group, a 1-propenyl group, a 1-butenyl group, a 1-pentenyl group, a 3-methyl-1-butenyl group, a phenylethenyl group, an ethynyl group, a 1-propynyl group, a 1-butynyl group, a 1-pentinyl group, a 3-methyl-1-butynyl group, a phenylbutynyl group and the like. In the case where the polysiloxane of the present invention contains two or more organic groups A, the organic group As in one molecule may be the same or different from each other. As the organic group A, a vinyl group having small carbon number and whose material is easily available and a parastyryl group with favorable reactivity are preferable. The organic group having small carbon number leads to an increased ratio of an inorganic component in the polysiloxane cured material and improves heat resistance.

In the general formula (1) above, $R^1$ is an alkylene group (divalent aliphatic group) having carbon atoms of 1 to 20, a divalent aromatic group having carbon atoms of 6 to 20, or a divalent alicyclic group having carbon atoms of 3 to 20. Examples of the alkylene group having carbon atoms of 1 to 20 include a methylene group, an ethylene group, a n-propylene group, an i-propylene group, a n-butylene group, an i-butylene group and the like. Examples of the divalent aromatic group having carbon atoms of 6 to 20 include a phenylene group, a naphtylene group and the like. In addition, examples of the divalent alicyclic group having carbon atoms of 3 to 20 include a divalent hydrocarbon group containing a norbornene backbone, a tricyclodecane backbone or an adamantane backbone, and the like.

Further, in the general formula (1) above, n is 0 or 1. Since the carbon number is small and the polysiloxane cured material has excellent heat resistance, n=0 is preferable.

In the general formula (1) above, w is preferably 0 to 40, more preferably 0 to 30, further preferably 0 to 20, and particularly 0 to 10.

In the general formula (1) above, $R^2$ is an alkyl group having carbon atoms of 1 to 10, or an organic group having carbon atoms of 2 to 10 containing a hydrosilylatable carbon-carbon unsaturated group. Specific examples of the alkyl group include a methyl group, an ethyl group, a propyl group, a butyl group, a pentyl group, a hexyl group, a heptyl group, an octyl group, a nonyl group, a decyl group and the like. These groups may be aliphatic or alicyclic, and be linear or branched. The organic group having carbon atoms of 2 to 10 containing a hydrosilylatable carbon-carbon unsaturated group is not particularly limited so long as it is a functional group having a hydrosilylatable carbon-carbon unsaturated group containing a double bond or triple bond. Specific examples include a vinyl group, an ortho styryl group, a meta styryl group, a para styryl group, an acryloyl group, a methacryloyl group, an acryloxy group, a methacryloxy group, a 1-propenyl group, a 1-butenyl group, a 1-pentenyl group, a 3-methyl-1-butenyl group, a phenylethenyl group, an ethynyl group, a 1-propynyl group, a 1-butynyl group, a 1-pentinyl group, a 3-methyl-1-butynyl group, a phenylbutynyl group and the like. $R^2$s in one molecule are the same or different from each other. Additionally, $R^2$s may be in combination of two or more different types thereof. $R^2$ is preferably a hydrogen atom, a methyl group and a vinyl group since the carbon number is small and the polysiloxane cured material has excellent heat resistance. Further, a hydrogen atom and a vinyl group are particularly preferable since they can participate in curing reaction of the polysiloxane.

In the general formula (1) above, x is preferably in the range from 0.1 to 40, more preferably from 0.1 to 30, further preferably from 0.2 to 20, and particularly from 0.3 to 10.

In the general formula (1) above, $R^3$ is a hydrogen atom or an organic group having 2 to 10 carbon atoms containing a hydrosilylatable carbon-carbon unsaturated group. The hydrosilylatable carbon-carbon unsaturated group is not particularly limited so long as it is a functional group having a hydrosilylatable carbon-carbon unsaturated group containing a double bond or triple bond. Specific examples include a vinyl group, an ortho styryl group, a meta styryl group, a para styryl group, an acryloyl group, a methacryloyl group, an acryloxy group, a methacryloxy group, a 1-propenyl group, a 1-butenyl group, a 1-pentenyl group, a 3-methyl-1-butenyl group, a phenylethenyl group, an ethynyl group, a 1-propynyl group, a 1-butynyl group, a 1-pentinyl group, a 3-methyl-1-butynyl group, a phenylbutynyl group and the like. $R^3$s in one molecule are the same or different from each other. Additionally, $R^3$s may be in combination of two or more different types thereof. $R^3$ is preferably a hydrogen atom and a vinyl group since the carbon number is small, they can participate in curing reaction of the polysiloxane and the polysiloxane cured material has excellent heat resistance.

In the general formula (1) above, $R^4$ is a hydrogen atom, an alkyl group having 1 to 10 carbon atoms or an organic group having 2 to 10 carbon atoms containing a hydrosilylatable carbon-carbon unsaturated group. Specific examples of the alkyl group include a methyl group, an ethyl group, a propyl group, a butyl group, a pentyl group, a hexyl group, a heptyl group, an octyl group, a nonyl group, a decyl group and the like. These groups may be linear, branched or cyclic. The organic group having carbon atoms of 2 to 10 containing a hydrosilylatable carbon-carbon unsaturated group is not particularly limited so long as it is a functional group having a hydrosilylatable carbon-carbon unsaturated group containing a double bond or triple bond. Specific examples include a vinyl group, an ortho styryl group, a meta styryl group, a para styryl group, an acryloyl group, a methacryloyl group, an acryloxy group, a methacryloxy group, a 1-propenyl group, a 1-butenyl group, a 1-pentenyl group, a 3-methyl-1-butenyl group, a phenylethenyl group, an ethynyl group, a 1-propynyl group, a 1-butynyl group, a 1-pentinyl group, a 3-methyl-1-butynyl group, a phenylbutynyl group and the like. $R^4$s in one molecule are the same or different from each other. Additionally, $R^4$s may be in combination of two or more different types thereof. $R^4$ is preferably a hydrogen atom, a methyl group and a vinyl group since the reactivity is favorable and the carbon number is small. Methyl group is particularly preferable because of ease in handling of a raw material and an interim product.

In the general formula (1) above, y is preferably in the range from 0.1 to 50, more preferably from 0.5 to 30, further preferably from 1 to 20, and particularly from 2 to 10.

In the general formula (1) above, $R^5$ is an alkyl group having 1 to 6 carbon atoms. Specific examples of the alkyl group include a methyl group, an ethyl group, a propyl group, a butyl group, a pentyl group and a hexyl group.

In the general formula (1) above, z is preferably in the range from 0.1 to 20, more preferably from 0.2 to 10, further preferably from 0.3 to 8, and particularly from 0.5 to 5.

In the general formula (1) above, the relationship between v, w and x is preferably $0.001 \leq x/(v+w) \leq 2$, more preferably $0.01 \leq x/(v+w) \leq 1$, further preferably $0.02 \leq x/(v+w) \leq 0.7$, and particularly $0.04 \leq x/(v+w) \leq 0.5$. If $x/(v+w)$ is too small, viscosity tends to become high or heat resistance of a heated cured material under an uncatalytic condition tends to be lower. On the other hand, if $x/(v+w)$ is too large, heat resistance of the heated cured material under the uncatalytic condition tends to lower.

The relationship between v, w and y is preferably $0.01 \leq y/(v+w) \leq 2$, more preferably $0.05 \leq y/(v+w) \leq 1$, further preferably $0.1 \leq y/(v+w) \leq 0.7$, and particularly $0.15 \leq y/(v+w) \leq 0.4$. If $y/(v+w)$ is too small, viscosity tends to become high or heat resistance of a heated cured material under an uncatalytic condition tends to be lower. On the other hand, if $y/(v+w)$ is too large, heat resistance of the heated cured material under the uncatalytic condition tends to lower.

In addition, the relationship between v, w, x, y and z is preferably $0.01 \leq z/(v+w+x+y) \leq 1$, more preferably $0.02 \leq z/(v+w+x+y) \leq 0.5$, further preferably $0.03 \leq z/(v+w+x+y) \leq 0.3$, and particularly $0.04 \leq z/(v+w+x+y) \leq 0.1$. If $z/(v+w+x+y)$ is too small, curability under an uncatalytic condition tends to be lower. On the other hand, if $z/(v+w+x+y)$ is too large, preservation stability of the polysiloxane tends to be lower or heat resistance of the heated cured material tends to be lower.

However, in the case of w=0, at least one of $R^2$, $R^3$ and $R^4$ is an organic group having carbon atoms of 2 to 10 containing a hydrosilylatable carbon-carbon unsaturated group.

The polysiloxane in which v, w, x, y and z satisfy the above conditions in the general formula (1) has low viscosity and excellent workability, and lead to a film consisting of a cured material with favorable appearance and excellent heat resistance.

The polysiloxane of the present invention has a number average molecular weight of 500 to 20,000. The number average molecular weight is preferably from 700 to 15,000, more preferably from 900 to 10,000, and particularly from 1,000 to 5,000. The number average molecular weight can be acquired by GPC (Gel permeation chromatography) using, for example, "GL-A130-S" (porous micro spherical polymer gel) by Hitachi Chemical Co., Ltd. as a column, toluene as an eluent, and polystyrene as a standard substance.

The polysiloxane of the present invention is a liquid and has a viscosity at 25° C. of preferably 30,000 mPa·s or less, more preferably 10,000 mPa·s or less, further preferably 5,000 mPa·s or less, furthermore preferably 3,000 mPa·s or less, and particularly preferably 1,000 mPa·s or less. The lower limit is usually 1 mPa·s.

The method for the production of the polysiloxane of the present invention is characterized in that the method comprises a first process for conducting a hydrolysis and polycondensation reaction of a silicon compound (T) having three hydrolyzable groups, a silicon compound (D) having two hydrolyzable groups, and a silicon compound (M) having one hydrolyzable group in the presence or absence of an organic solvent, at least one compound of the silicon compound (T), the silicon compound (D), and the silicon compound (M) has a hydrosilyl group, and at least one compound of the silicon compound (T), the silicon compound (D), and the silicon compound (M) has a hydrosilylatable carbon-carbon unsaturated group.

Additionally, the present invention preferably has a second process for distilling water under presence of a solvent consisting of an aromatic hydrocarbon having a boiling point of 90° C. or higher is preferably provided after the first process.

The types, formulating amounts and the like of the silicon compound (T), the silicon compound (D) and the silicon compound (M) used in the first process according to the production method of the polysiloxane of the present invention are as described above.

In the production method of the polysiloxane of the present invention, the hydrolyzable group in the silicon compound (T) and the silicon compound (D) is preferably an alkoxy group, and the hydrolyzable group in the silicon compound (M) is preferably an alkoxy group or a siloxy group.

The first process is a process in which the silicon compounds (T), (D) and (M) are hydrolyzed and polycondensed in the presence or non-presence of an organic solvent. Examples of the organic solvent include an aromatic hydrocarbon such as toluene, xylene, benzene, mesitylene and ethyl benzene; an ether such as diisopropyl ether; an ester such as ethyl acetate, 2-methoxy-1-methylethyl acetate; and the like. These compounds may be used singly or in combination of two or more types thereof. Additionally, a nonpolar solvent such as the above aromatic hydrocarbon and a polar solvent including a lower alcohol such as methanol, ethanol and isopropyl alcohol are used in combination. In the case where the organic solvent is used in the first process, the amount to be used is preferably in the range from 0.5 to 10 parts by weight, more preferably from 0.8 to 7 parts by weight, and further preferably from 1 to 5 parts by weight based on 100 parts by weight of the total amount of the silicon compounds (T), (D) and (M). A method of using the aromatic hydrocarbon having a boiling point of 90° C. or higher such as aromatic hydrocarbon including toluene, xylene, mesitylene and ethyl benzene as a reaction solvent is preferable since generation of a gel can be suppressed in the first process for the production of the polysiloxane and the process for distilling a volatile component.

In the case where a nonpolar solvent such as toluene and xylene is used as the organic solvent in the first process, a lower alcohol such as methanol, ethanol and isopropyl alcohol, or other polar solvents are preferably used at the same time. When the nonpolar solvent and a lower alcohol or other polar solvents are used in combination, a reaction liquid can be uniformly and the reaction can progress smoothly. In addition, the lower alcohol binds to a silicon atom to form an alkoxy group. If isopropyl alcohol is used, for example, an isopropoxysilyl group is introduced into a polysiloxane, and a polysiloxane having well-balanced stability and reactivity can be obtained.

The amount of water to be added in the first process is preferably 0.5 to 5 times, and more preferably 1 to 2 times by mol with respect to the hydrolyzable group. Additionally, the hydrolysis and polycondensation reaction of the silicon compounds (T), (D) and (M) may be carried out under an uncatalytic condition or in the present of a catalyst. When the catalyst is used, an acid catalyst is usually used such as an inorganic acid including sulfuric acid, nitric acid, hydrochloric acid, phosphoric acid and the like; an organic acid including formic acid, acetic acid, oxalic acid, paratoluenesulfonic acid and the like. It is noted that when an alkali catalyst is used, a hydrosilyl group is hydrolyzed to generate a hydrogen gas, and that the alkali catalyst should not be used. When the acid catalyst is used, or water is added in the absence of a catalyst and agitation is performed at a room temperature, the hydrolysis and polycondensation reaction easily progresses. Heating or cooling may be performed as necessary. In the case where the first process is carried out under an uncatalytic condition, at least one compound of the silicon compounds (T), (D) and (M) is preferably a silicon compound generating acid by hydrolysis reaction. The generated acid can be made to act as a catalyst.

Additionally, in the case where the silicon compounds (T), (D) and (M) are compounds not generating acid by the hydrolysis reaction, using an acid catalyst leads to a quick hydrolysis and polycondensation reaction, being favorable. The amount of the acid catalyst used is preferably an amount corresponding to 0.01% to 20% by mol, and more preferably 0.1% to 10% by mol with respect to the total amount of the silicon atom in the silicon compound (T), the silicon atom in the silicon compound (D), or the silicon atom in the silicon compound (M).

The termination of the hydrolysis and polycondensation reaction in the first process can be confirmed by analyzing a reaction liquid with gas chromatography (GC), for example.

In the case where only the silicon monomer (M1) is used as the silicon compound (M), the reaction termination can be confirmed by loss of all the GC peaks deriving from the silicon compounds (T) and (D), and the silicon monomer (M1). In the case where only the silicon dimer (M2) is used as the silicon compound (M), the reaction termination can be confirmed by loss of the GC peaks deriving from the silicon compounds (T) and (D), and substantial stop of a change in the size of the peak deriving from the silicon dimer (M2). In the case where the silicon monomer (M1) and the silicon dimer (M2) are both used as the silicon compound (M), the reaction termination can be confirmed by loss of the GC peaks deriving from the silicon compounds (T) and (D), and the silicon monomer (M1), and substantial stop of a change in the size of the peak deriving from the silicon dimer (M2).

In the present invention, the second process for distilling water contained in the reaction liquid obtained by the first process in the presence of a solvent consisting of an aromatic hydrocarbon having a boiling point of 90° C. or higher can be provided. This process is effective in the case where the reaction in the first process is performed in the presence of an organic solvent. According to this process, generation of a gel can be suppressed. As the solvent, toluene, xylene and the like are preferable.

In the second process, reduced-pressure distillation is usually performed. In the case where a free alcohol is remained in addition to the above organic solvent and water, when a volatile component such as unreacted silicon dimer (M2) is distilled based on the technique, a target polysiloxane, that is, a polysiloxane having a hydrosilylatable carbon-carbon unsaturated group, hydrosilyl group and alkoxysilyl group and also having a number average molecular weight of 500 to 20,000 is obtained.

The production method of the polysiloxane of the present invention is one for obtaining a polysiolxane containing the following structural unit represented by the general formula (2).

[In the formula, A is an organic group having 2 to 10 carbon atoms containing a hydrosilylatable carbon-carbon unsaturated group, $R^1$ is an alkylene group having 1 to 20 carbon atoms, a divalent aromatic group having 6 to 20 carbon atoms or a divalent alicyclic group having 3 to 20 carbon atoms, n is 0 or 1, $R^2$ is a hydrogen atom, an alkyl group having 1 to 10 carbon atoms or an organic group having 2 to 10 carbon atoms containing a hydrosilylatable carbon-carbon unsaturated group ($R^2$s in one molecule may be the same or different), $R^3$ is a hydrogen atom or an organic group having 2 to 10 carbon atoms containing a hydrosilylatable carbon-carbon unsaturated group, $R^4$ is a hydrogen atom, an alkyl group having 1 to 10 carbon atoms or an organic group having 2 to 10 carbon atoms containing a hydrosilylatable carbon-carbon unsaturated group ($R^4$s in one molecule may be the same or different), $R^5$ is an alkyl group having 1 to 6 carbon atoms, v, x, y and z are positive numbers, w is zero or a positive number, they have relationships of $0.001 \leq x/(v+w) \leq 2$, $0.01 \leq y/(v+w) \leq 2$, and $0.01 \leq z/(v+w+x+y) \leq 1$. However, when w is zero, at least one of $R^2$, $R^3$ and $R^4$ is an organic group having 2 to 10 carbon atoms containing a hydrosilylatable carbon-carbon unsaturated group.]

The preferable conditions for A, $R^1$, n, $R^2$, $R^3$, $R^4$, $R^5$, v, w, x, y and z are the same as those in the general formula (1) above.

When the polysiloxane containing structural units represented by the above general formula (2), ratios of the silicon compounds (T), (D) and (M) used in the first process are respectively preferably 30% to 80% by mol, 1% to 30% by mol and 5% to 50% by mol, more preferably 40% to 75% by mol, 2% to 25% by mol and 10% to 45% by mol, and further preferably 50% to 70% by mol, 2% to 20% by mol and 15% to 40% by mol, based on 100% by mol of the total of them.

Hereinafter, the production method of the present invention is described in detail using an example.

A production method of the polysiloxane containing a (HSiO$_{3/2}$) unit as the structural unit T, a (H(Me)SiO$_{2/2}$) unit as the structural unit D, a (Vi(Me)$_2$SiO$_{1/2}$) unit as the structural unit M, and a (iPrO$_{1/2}$) unit and a (EtO$_{1/2}$) unit as the alkoxy group will be described. Reference symbols "Me", "Et", "iPr" and "Vi" are, respectively, a methyl group, an ethyl group, an isopropyl group and a vinyl group.

As the silicon compound (T) forming the (HSiO$_{3/2}$) unit which is the structural unit T, a compound represented by the following general formula (3) can be used:

(3)

[In the formula, $X^1$ is a hydrolyzable group such as an alkoxy group having carbon atoms of 1 to 10 and a halogen atom, or is a hydroxyl group. Plural $X^1$s may be the same or different from each other in the same molecule.]

In the general formula (3), X is preferably a methoxy group, an ethoxy group, isopropoxy group, chloro atom and the like, because of availability of a raw material, favorable reactivity and the like.

Specific examples of the compound represented by the general formula (3) include trimethoxy silane, triethoxy silane, tripropoxy silane, trichloro silane and the like. These compounds may be used singly or in combination of two or more types thereof.

As the silicon compound (D) forming the (H(Me) SiO$_{2/2}$) unit which is the structural unit D, a compound represented by the following general formula (4) can be used:

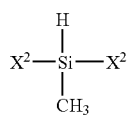

(4)

[In the formula, X$^2$ is a hydrolyzable group such as an alkoxy group having carbon atoms of 1 to 10 and a halogen atom, or is a hydroxyl group. Plural X$^2$s may be the same or different from each other in the same molecule.]

In the general formula (4), X$^2$ is preferably a methoxy group, an ethoxy group, isopropoxy group, chloro atom and the like, because of availability of a raw material, favorable reactivity and the like.

Specific examples of the compound represented by the general formula (4) include dimethoxymethyl silane, diethoxymethyl silane, dipropoxymethyl silane, dichloromethyl silane and the like. These compounds may be used singly or in combination of two or more types thereof.

As the silicon compound (M) forming the (Vi(Me)$_2$SiO$_{1/2}$) unit which is the structural unit M, the silicon dimer (M2) represented by the following general formula (5) (it is 1,3-divinyltetramethyldisiloxane) or the silicon monomer (M1) represented by the following general formula (6) can be used.

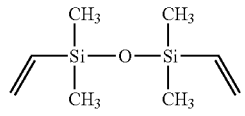

(5)

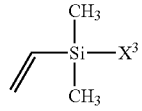

(6)

[In the formula, X$^3$ is a hydrolyzable group such as an alkoxy group having carbon atoms of 1 to 10 and a halogen atom, or is a hydroxyl group.]

In the general formula (6), X$^3$ is preferably a methoxy group, an ethoxy group, isopropoxy group, chloro atom and the like, because of availability of a raw material, favorable reactivity and the like.

Specific examples of the compound represented by the general formula (6) include methoxyvinyldimethylsilane, ethoxyvinyldimethylsilane, propoxyvinyldimethylsilane, chlorovinyldimethylsilane and the like. These compounds may be used singly or in combination of two or more types thereof.

When the silicon dimer (M2) represented by the formula (5) is used as the silicon compound (M), as having been already described, a part of it remains unreacted. Therefore, a charging ratio in relation to the other materials needs to be increased to approximately 1.2 to 3 times by weight, for example. When the silicon dimer (M2) is used, an excess amount is needed as above, but this is a material which is more practical than the generally expensive silicon monomer (M1) and can be obtained relatively inexpensively.

When triethoxysilane, dimethoxymethylsilane and 1,3-divinyltetramethyldisiloxane are respectively used as the silicon compounds (T), (D) and (M), the polysiloxane is produced as follows.

These silicon compounds and an organic solvent such as xylene are contained in a reactor and the inside of the reactor is purged with a nitrogen gas or the like to be an inactive atmosphere. After that, an acid catalyst such as a hydrochloric aqueous solution is dropped while a reaction system is agitated, and hydrolysis and polycondensation reaction are carried out (first process). The temperature of the reaction system is usually in the range from 0° C. to 80° C. In this first process, a lower alcohol such as isopropyl alcohol can be used as necessary. When the lower alcohol is used, it may be contained in the reactor in advance or dropped with the acid catalyst.

Subsequently, an evaporator or the like is used to distill water, an organic solvent and the like from the reaction liquid to isolate the polysiloxane (second process).

According to the polysiloxane of the present invention, a polysiloxane cured material having a cross-linking structure can be obtained by hydrosilylation reaction between a hydrosilylatable carbon-carbon unsaturated group contained in one polysiloxane and a hydrosilyl group contained in another polysiloxane. In the production of the polysiloxane cured material, a catalyst for the hydrosilylation reaction, which will be described later, may be used or may not be used.

In the case where the catalyst for the hydrosilylation reaction is not used, the curing temperature is usually in the range from 40° C. to 1,000° C., and preferably from 50° C. to 700° C. Within this range of temperature, the curing temperature may be made constant or may be combined with temperature rise and/or temperature fall. The curing time is usually in the range from 0.1 to 10 hours.

The production method of a polysiloxane cured material of the present invention is characterized by including a process for heating the above-mentioned polysiloxane of the present invention at a temperature range from 150° C. to 700° C. in the absence of a catalyst for the hydrosilylation reaction. Within this range of temperature, the curing temperature may be made constant or may be combined with temperature rise and/or temperature fall. Additionally, a curing time is usually in the range from 0.1 to 10 hours, and preferably from 0.5 to 5 hours. The heating condition from a room temperature to the above range of temperature is not particularly limited.

When curing is performed within the above range of the temperature, the alkoxysilyl group in the polysiloxane reacts and contributes to cross-linking, and an obtained polysiloxane cured material does not substantially include the alkoxysilyl group and has extremely excellent heat resistance. Under an uncatalytic condition, a hydrosilylation reaction rate is not particularly high, and molecules of polysiloxane can move freely to some degree at the beginning of the reaction, and it is presumed that reaction of the alkoxysilyl group is rarely obstructed.

Another production method of a polysiloxane cured material of the present invention is characterized by including a process for heating the above-mentioned polysiloxane of the present invention at a temperature of 50° C. or higher and lower than 150° C. in the absence of a catalyst for the hydrosilylation reaction, and a process for heating at a temperature range from 150° C. to 700° C., sequentially. Within the temperature range of 50° C. or higher and lower than 150° C. and the temperature range from 150° C. to 700° C., the curing temperature may be made constant or may be combined with temperature rise and/or temperature fall.

At a temperature range of 50° C. or higher and lower than 150° C., an alkoxysilyl group is mainly subjected to reaction (hydrolysis and polycondensation reaction) to cure partially and form a cross-linking structure. After that, at a temperature range from 150° C. to 700° C., a hydrosilylation reaction is mainly performed for cross-linking. When the polysiloxane has a silanol group, it contributes to a cross-linking by condensation reaction at a relatively low temperature.

Advantages of partial curing include a higher degree of freedom in a work for forming a polysiloxane cured film on a substrate, which will be described later.

For example, a polysiloxane film is formed on a surface of a plate-shaped substrate and heated to a temperature range of 50° C. or higher and lower than 150° C. to partially cure the polysiloxane film. As a result, fluidity of the polysiloxane is eliminated, and this laminate (the plate-shaped substrate provided with the polysiloxane partially cured film) is worked as necessary so as to obtain a desired shape. After that, the laminate is heated to a temperature range from 150° C. to 700° C. to fully cure the polysiloxane partially cured film. Thereby a composite body in which a uniform polysiloxane cured film is formed on the surface of the plate-shaped substrate can be obtained. The cured film can be formed not only on the plate-shaped substrate but also on a substrate having a complicated shape.

As another example, a polysiloxane film is formed on a surface of a particle substrate and heated to a temperature range of 50° C. or higher and lower than 150° C. to partially cure the polysiloxane film. As a result, a coated particle provided with the polysiloxane partially cured film is obtained. After that, the coated particle is heated to a temperature from 150° C. to 700° C. so as to fully cure the polysiloxane partially cured film. Thereby a composite particle in which a uniform polysiloxane cured film is formed on the surface of the particle substrate can be obtained.

The curing time in the first-half stage in the case of partial curing at a temperature range of 50° C. or higher and lower than 150° C. is usually in the range from 0.1 to 10 hours, and preferably from 0.5 to 5 hours. After that, the curing time in the case of full curing at a temperature range from 150° C. to 700° C. is usually in the range from 0.1 to 10 hours, and preferably from 0.5 to 5 hours.

In the case where the catalyst for the hydrosilylation reaction is used, curing is possible at a relatively low temperature (range from a room temperature to 150° C., preferably from 50° C. to 150° C., for example). However, the obtained polysiloxane cured material can easily have an unreacted alkoxysilyl group, and if it is exposed to a high temperature (600° C. or higher, for example), it might generate a volatile component such as alcohol. The reason why the unreacted alkoxysilyl group tends to remain is presumed that since cross-linking by hydrosilylation reaction quickly occurs, motion of a molecule of the polysiloxane is limited in a short time from start of curing, the alkoxysilyl group is contained, and a chance of reaction is lost.

The curing time in the case of using catalyst for the hydrosilylation reaction is usually in the range from 0.05 to 24 hours, and preferably from 0.1 to 5 hours.

Examples of the catalyst for the hydrosilylation reaction include a simple substance of group 8 element to group 10 element metal such as cobalt, nickel, ruthenium, rhodium, palladium, iridium and platinum; an organic metallic complex thereof; a metallic salt thereof; a metallic oxide thereof; and the like. Usually, a platinum-based catalyst is used. Examples of the platinum-based catalyst include cis-PtCl$_2$(PhCN)$_2$, platinum carbon, platinum complex (Pt(dvs)) in which 1,3-divinyltetramethyldisiloxane is coordinated, platinum vinyl methyl ring siloxane complex, platinum carbonyl-vinyl methyl ring siloxane complex, tris(dibenzylideneacetone)diplatinum, chloroplatinic acid, bis ethylene) tetrachloro diplatinum, cyclooctadiene dichloro platinum, bis (cyclooctadiene)platinum, bis(dimethylphenylphosphine) dichloro platinum, tetrakis(triphenylphosphine)platinum, and the like. Platinum complex (Pt(dvs)) in which 1,3-divinyltetramethyldisiloxane is coordinated, platinum vinyl methyl ring siloxane complex, and platinum carbonyl-vinyl methyl ring siloxane complex are particularly preferable among them. "Ph" is a phenyl group. The amount of the catalyst used is preferably in the range from 0.1 ppm to 1,000 ppm by weight, more preferably from 0.5 ppm to 100 ppm by weight, and further preferably from 1 ppm to 10 ppm by weight based on the amount of the polysiloxane.

When the catalyst for the hydrosilylation reaction is used, a hydrosilylation reaction suppressor may be added in order to suppress gelation of the polysiloxane to which the catalyst is added and to improve preservation stability. Examples of the hydrosilylation reaction suppressor include methylvinylcyclotetrasiloxane; an acetylenic alcohol; a siloxane modified acetylenic alcohol; a hydroperoxide; a hydrosilylation reaction suppressor containing a nitrogen atom, sulfur atom or phosphor atom; and the like.

Curing of the polysiloxane may be carried out in the air or an inactive gas atmosphere such as nitrogen gas regardless of the presence of a catalyst. As long as an alkoxysilyl group is present in the polysiloxane, atmosphere containing moisture to such a degree that the alkoxysilyl group can be hydrolyzed is preferable. In the case of reaction in the air, since the air contains moisture to such a degree that the alkoxysilyl group can be hydrolyzed, sufficient curing can progress. In another production method of a polysiloxane cured material of the present invention, it is preferable that the curing in the first stage is carried out in the air, and the curing in the second stage in the air or in the inactive gas atmosphere.

Since the polysiloxane of the present invention is a liquid material, as mentioned above, having a viscosity of 30,000 mPa·s or less at 25° C., the polysiloxane can be directly applied to a surface of a substrate. The polysiloxane may be diluted as necessary. When a solvent is used, a solvent capable of dissolving the polysiloxane is preferable. Example thereof includes an aliphatic hydrocarbon-based solvent, an aromatic hydrocarbon-based solvent, a chlorinated hydrocarbon-based solvent, an alcohol-based solvent, an ether-based solvent, an amide-based solvent, a ketone-based solvent, an ester-based solvent, a cellosolve-based solvent and other organic solvent.

When the solvent is used, prior to heating for curing polysiloxane, the solvent contained in the applied film is preferably volatilized. The volatilization of the solvent may be performed in the air or the inactive gas atmosphere. Heating may be performed for volatilizing the solvent, but the heating temperature is preferably lower than 150° C. and more preferably at a temperature range of 50° C. or higher and lower than 150° C. In another production method of a polysiloxane cured material of the present invention, it is possible to partially cure the polysiloxane by heating it to a temperature range of 50° C. or higher and lower than 150° C., which is made a solvent volatilization process.

The polysiloxane of the present invention may be added with various additives before being offered for curing.

Examples of the additives include a reactive diluent such as a tetraalkoxysilane and a trialkoxysilane including trialkoxysilane, trialkoxyvinylsilane and the like, and the like. These additives are used in a range where heat resistance of an obtained polysiloxane cured material is not damaged.

For the application of the polysiloxane to a substrate, a conventional application method such as casting method, spin coating method and bar coating method can be used.

The substrate is not particularly limited on which a polysiloxane cured material film is formed so long as it is a structural body having material and shape on which a film can be formed by application. However, if a substrate having low heat resistance is used, the upper limit of the polysiloxane curing temperature becomes a temperature that the substrate can withstand.

Structural material of the substrate is usually an inorganic material, an organic material or a material combining them. Example of the preferable material includes a metal, an alloy, a ceramics, a wood, a plastic and the like. Additionally, examples of the shape include a sheet, a plate, a cube, a rectangular parallelepiped, a pyramid, a cone, a linear body (straight, curved and the like), an annular body (circular, polygonal and the like), a pipe, a finite form body such as a sphere, an infinite form body having projection and recess, groove, through hole, corner and the like. Specifically, plate-shaped glass, silicon wafer, plastics worked into various shapes, construction materials, metal worked into various shapes and the like are included.

Heat resistance of the polysiloxane cured material can be measured by a simultaneous thermogravimetry and differential thermal analyzer (TG/DTA) or the like. The polysiloxane cured material obtained by curing the polysiloxane of the present invention without using a catalyst for the hydrosilylation reaction can have a 5% weight loss temperature of 1,000° C. or higher without relying on its curing condition and presents high heat resistance.

EXAMPLE

Hereinafter, the present invention is specifically described using Examples and Comparative Examples, however, the present invention is in no way limited to the embodiments by Examples without departing from the scope of the invention.

In the GPC measurement for Examples and Comparative Examples, an apparatus including "L-5020" manufactured by Hitachi, Ltd. for column oven, "L-3300RI monitor" manufactured by Hitachi, Ltd. for RI detector, "L-6250" manufactured by Hitachi, Ltd. for pump, and "DEGAS" manufactured by Showa Denko K.K. for degasser was used. Serially-concatenated products "GL-A-150-S" and "GL-A130-S" manufactured by Hitachi Chemical Co., Ltd. were used as the column. Toluene was used as an eluent at a flow rate of 1 ml per minute for the measurement. Polystyrene was used as standard to calculate a number-average molecular weight (Mn).

Example 1

A magnetic rotor, a dropping funnel, a reflux condenser and a thermometer were attached to a 1,000 ml four-necked flask, and the inside of the flask was purged with nitrogen gas. During the reaction, nitrogen gas was continuously flowed.

The flask was charged with 59.14 g (360 mmol) of triethoxysilane, 17.79 g (120 mmol) of trimethoxyvinylsilane, 6.92 g (57.6 mmol) of dimethoxydimethylsilane, 16.12 g (120 mmol) of 1,1,3,3-tetramethyldisiloxane, 88.38 g of 2-propanol, and 265.14 g of xylene.

After that, a mixture of 34.96 g of 1.28% hydrochloric acid and 44.19 g of 2-propanol was gradually added through the dropping funnel to the above mixture in a room-temperature state (19° C.) while stirring. During the dropping, a liquid temperature in the flask was maintained in a range from 19° C. to 22° C. After the dropping of the mixture of hydrochloric acid and 2-propanol was finished, the reaction liquid was left at a room temperature for 18 hours.

Subsequently, a volatile component including water was distilled from the reaction liquid at a temperature range from 23° C. to 60° C. under reduced pressure from 52 to 1 mmHg to obtain 42.79 g of a liquid in slightly pale yellow (hereinafter referred to as "polysilolxane (P1)"). The molecular weight (Mn) of this polysiloxane (P1) was measured using GPC, and the result was 1,300. Additionally, viscosity at 25° C. was measured using E-type viscometer, and the result was 43 mPa·s.

Table 1 shows a charged amount (molar ratio) of the silicon compound and the above physical characteristics.

Analytical results of $^1$H-NMR (nuclear magnetic resonance spectrum) for the polysiloxane (P1) were as follows.

$^1$H-NMR ($C_6D_6$, δ (ppm): −0.2-0.6 (br, Si—$CH_3$), 0.9-1.5 (br, OCH($CH_3$)$_2$, OCH$_2$$CH_3$), 3.5-4.1 (br, O$CH_2$CH$_3$), 4.1-5.5 (br, O$CH$(CH$_3$)$_2$, Si—H), 5.7-6.4 (br, CH=$CH^2$).

A reaction rate of 1,1,3,3-tetramethyldisiloxane turned out to be 55% from $^1$H-NMR. The reaction rate was calculated as follows.

First, ratios of the methyl group binding to a silicon atom and the vinyl group were acquired from $^1$H-NMR. The methyl groups binding to the silicon atom are derived from dimethoxydimethylsilane and 1,1,3,3-tetramethyldisiloxane, and the vinyl group is derived from trimethoxyvinylsilane. Since trimethoxyvinylsilane and dimethoxydimethylsilane among them react substantially stoichiometrically and are introduced into polysiloxane, a value obtained by subtracting a ratio derived from dimethoxydimethylsilane from a ratio of the methyl group binding to the silicon atom is a ratio derived from 1,1,3,3-tetramethyldisiloxane.

Additionally, an unreacted or generated alkoxysilyl group such as isopropoxysilyl group and ethoxysilyl group were observed in polysiloxane (P1). The ratio of the alkoxysilyl group (alkoxy group) can be also acquired from $^1$H-NMR. The analysis values are shown in Table 2.

From Mn described in Table 1 and a molar ratio of each structural unit described in Table 2, an average number of each structural unit contained in one molecule of polysiloxane was acquired and shown in Table 3.

Subsequently, the obtained polysiloxane was used to produce a cured material of polysiloxane under two types of curing conditions, and heat resistance and adhesiveness were evaluated.

The above-mentioned polysiloxane (not containing a catalyst for the hydrosilylation reaction) was applied on a glass plate using a bar coater, and then the polysiloxane was heated at a temperature of 130° C. for 4 hours to form a cured material (cured film) having a thickness of approximately 10 μm. No generation of a crack was found at this time. This cured material was evaluated using a simultaneous thermogravimetry and differential thermal analyzer "TG/DTA220" (model name) by SII Nano Technology Inc., and the result was that the 5% weight loss temperature of the cured material at a temperature rising rate of 20° C./minute under a nitrogen gas atmosphere was 1,000° C. or higher, and a weight loss of the cured material having reached 1,000° C. was 4.3%. The 5% weight loss temperature was also 1,000° C. or higher at a temperature rising rate of 20° C./minute under an air atmosphere.

According to the infrared absorption spectrum of the cured material (partially cured material) obtained by heating at a temperature of 130° C. for 4 hours, most of the vinyl group remained unreacted. In the partially cured material, the hydrosilylation reaction progressed during heating and temperature rise by the TG/DTA, and the vinyl group was consumed, with which high heat resistance emerged.

The fact that the alkoxysilyl group was hydrolyzed under a condition of heating at a temperature of 130° C. for 4 hours was confirmed by detection of isopropyl alcohol and ethyl alcohol by adsorbent trapping—thermal desorption and cold trap injection—gas chromatography and mass spectrometry (TCT-GC/MS).

The partially cured material by the heating at 130° C. for 4 hours was further heated to a temperature of 400° C. at a temperature rising rate of 20° C./minute so as to obtain a cured material. Mass decrease in this heating was not observed. Additionally, it was confirmed by the result of the infrared absorption spectrometry (IR) that the cured material rarely contains the vinyl group (that is, the hydrosilylation reaction has been substantially completed). In the IR spectrum, characteristic absorption is observed around 1,400 $cm^{-1}$ and around 1,600 $cm^{-1}$ in the vinyl group. The 5% weight loss temperature of the cured material by TG/DTA was 1,000° C. or higher both for nitrogen atmosphere and air atmosphere.

The above polysiloxane (not containing a catalyst for the hydrosilylation reaction) was applied on a steel plate (SPCC-SD) using a bar coater and then the polysiloxane was heated at a temperature of 130° C. for 4 hours. It was further heated at a temperature of 170° C. for 4 hours or at 200° C. for 1 hour to form a cured material (cured film) having a thickness of approximately 10 μm. No generation of a crack was found at this time. Progress of the hydrosilylation reaction by the above heating and curing was confirmed by IR spectrum. For the obtained cured film, a cross-cut peeling test (according to JIS K5400, 8.5.1 or 8.5.2) was conducted and adherence to the steel plate was evaluated, and favorable adherence of 100/100 was confirmed.

The above evaluation results were shown in Table 4.

Example 2

Except that 44.35 g (270 mmol) of triethoxysilane, 13.34 g (90 mmol) of trimethoxyvinylsilane, 2.16 g (18 mmol) of dimethoxydimehylsilane, 12.09 g (90 mmol) of 1,1,3,3-tetramethyldisiloxane, 95.07 g of 2-propanol, 190.14 g of xylene, and 22.01 g of 1.28% hydrochloric acid were used, 31.10 g of a slightly pale yellow liquid (hereinafter referred to as "polysiloxane (P2)") was obtained in the same manner as Example 1. This polysiloxane (P2) was measured for Mn, and the result was 1,100. In addition, viscosity at 25° C. was measured, and the result was 34 mPa·s (See Table 1).

Analytical results of $^1$H-NMR for the polysiloxane (P2) were as follows.

$^1$H-NMR ($C_6D_6$, δ (ppm): −0.2-0.6 (br, Si—$CH_3$), 0.9-1.5 (br, $OCH(CH_3)_2$, $OCH_2CH_3$), 3.5-4.1 (br, $OCH_2CH_3$), 4.1-5.5 (br, $OCH(CH_3)_2$, Si—H), 5.7-6.4 (br, $CH=CH^2$).

A reaction rate of 1,1,3,3-tetramethyldisiloxane turned out to be 64% from $^1$H-NMR.

Additionally, an unreacted or generated alkoxysilyl group such as isopropoxysilyl group and ethoxysilyl group were observed in polysiloxane (P2). The analysis values are shown in Table 2.

From Mn described in Table 1 and a molar ratio of each structural unit described in Table 2, an average number of each structural unit contained in one molecule of polysiloxane was acquired and shown in Table 3.

Heat resistance was then evaluated using TG/DTA in the same manner as Example 1. The result was shown in Table 4.

Example 3

Except that 49.28 g (300 mmol) of triethoxysilane, 12.60 g (85 mmol) of trimethoxyvinylsilane, 3.36 g (15 mmol) of trimethoxy (4-vinylphenyl)silane, 5.77 g (48 mmol) of dimethoxydimethylsilane, 10.75 g (80 mmol) of 1,1,3,3-tetramethyldisiloxane, 105.69 g of 2-propanol, 211.38 g of xylene, and 28.04 g of 1.28% hydrochloric acid were used, 32.92 g of a slightly pale yellow liquid (hereinafter referred to as "polysiloxane (P3)") was obtained in the same manner as Example 1. This polysiloxane (P3) was measured for Mn, and the result was 1,200. In addition, viscosity at 25° C. was measured, and the result was 93 mPa·s (See Table 1).

Analytical results of $^1$H-NMR for the polysiloxane (P3) were as follows.

$^1$H-NMR ($C_6D_6$, δ (ppm): −0.2-0.6 (br, Si—$CH_3$), 0.9-1.5 (br, $OCH(CH_3)_2$, $OCH_2CH_3$), 3.5-4.1 (br, $OCH_2CH_3$), 4.1-5.4 (br, $OCH(CH_3)_2$, Si—H), 5.5-6.7 (br, $CH=CH^2$), 7.1-8.0 (br, aromatic proton).

A reaction rate of 1,1,3,3-tetramethyldisiloxane turned out to be 64% from $^1$H-NMR.

Additionally, an unreacted or generated alkoxysilyl group such as isopropoxysilyl group and ethoxysilyl group were observed in polysiloxane (P3). The analysis values are shown in Table 2.

From Mn described in Table 1 and a molar ratio of each structural unit described in Table 2, an average number of each structural unit contained in one molecule of polysiloxane was acquired and shown in Table 3.

Heat resistance was then evaluated using TG/DTA in the same manner as Example 1. The result was shown in Table 4.

Example 4

Except that 65.71 g (400 mmol) of triethoxysilane, 5.10 g (48 mmol) of dimethoxymethylsilane, 18.64 g (100 mmol) of 1,3-divinyltetramethyldisiloxane, 116.61 g of 2-propanol, 233.22 g of xylene, and 25.48 g of 1.28% hydrochloric acid were used, 32.19 g of a slightly pale yellow liquid (hereinafter referred to as "polysiloxane (P4)") was obtained in the same manner as Example 1. This polysiloxane (P4) was measured for Mn, and the result was 1,800. In addition, viscosity at 25° C. was measured, and the result was 549 mPa·s (See Table 1).

Analytical results of $^1$H-NMR for the polysiloxane (P4) were as follows.

$^1$H-NMR ($C_6D_6$, δ (ppm): −0.1-0.6 (br, Si—$CH_3$), 0.9-1.5 (br, $OCH(CH_3)_2$, $OCH_2CH_3$), 3.5-4.1 (br, $OCH_2CH_3$), 4.1-5.4 (br, $OCH (CH_3)_2$, Si—H), 5.65-6.4 (br, $CH=CH_2$).

A reaction rate of 1,3-divinyltetramethyldisiloxane turned out to be 40% from $^1$H-NMR.

Additionally, an unreacted or generated alkoxysilyl group such as isopropoxysilyl group and ethoxysilyl group were observed in polysiloxane (P4). The analysis values are shown in Table 2.

From Mn described in Table 1 and a molar ratio of each structural unit described in Table 2, an average number of each structural unit contained in one molecule of polysiloxane was acquired and shown in Table 3.

Heat resistance was then evaluated using TG/DTA in the same manner as Example 1. The result was shown in Table 4.

Example 5

Except that 52.57 g (320 mmol) of triethoxysilane, 8.50 g (80 mmol) of dimethoxymethylsilane, 14.91 g (80 mmol) of 1,3-divinyltetramethyldisiloxane, 101.25 g of 2-propanol, 202.50 g of xylene, and 21.90 g of 1.28% hydrochloric acid were used, 28.28 g of a slightly pale yellow liquid (hereinafter referred to as "polysiloxane (P5)") was obtained in the same manner as Example 1. This polysiloxane (P5) was measured for Mn, and the result was 1,800. In addition, viscosity at 25° C. was measured, and the result was 195 mPa·s (See Table 1).

Analytical results of $^1$H-NMR for the polysiloxane (P5) were as follows.

$^1$H-NMR ($C_6D_6$, δ (ppm): −0.1-0.6 (br, Si—$CH_3$), 0.9-1.5 (br, OCH ($CH_3)_2$, $OCH_2CH_3$), 3.5-4.1 (br, $OCH_2CH_3$), 4.1-5.4 (br, OCH ($CH_3)_2$, Si—H), 5.65-6.4 (br, CH=$CH_2$).

A reaction rate of 1,3-divinyltetramethyldisiloxane turned out to be 38% from $^1$H-NMR.

Additionally, an unreacted or generated alkoxysilyl group such as isopropoxysilyl group and ethoxysilyl group were observed in polysiloxane (P5). The analysis values are shown in Table 2.

From Mn described in Table 1 and a molar ratio of each structural unit described in Table 2, an average number of each structural unit contained in one molecule of polysiloxane was acquired and shown in Table 3.

Heat resistance was then evaluated using TG/DTA in the same manner as Example 1. The result was shown in Table 4.

Example 6

Except that 46.00 g (280 mmol) of triethoxysilane, 11.15 g (105 mmol) of dimethoxymethylsilane, 13.05 g (70 mmol) of 1,3-divinyltetramethyldisiloxane, 94.92 g of 2-propanol, 189.84 g of xylene, and 20.44 g of 1.28% hydrochloric acid were used, 27.90 g of a slightly pale yellow liquid (hereinafter referred to as "polysiloxane (P6)") was obtained in the same manner as Example 1. This polysiloxane (P6) was measured for Mn, and the result was 1,500. In addition, viscosity at 25° C. was measured, and the result was 67 mPa·s (See Table 1).

Analytical results of $^1$H-NMR for the polysiloxane (P6) were as follows.

$^1$H-NMR ($C_6D_6$, δ (ppm): −0.1-0.6 (br, Si—$CH_3$), 0.9-1.5 (br, OCH ($CH_3)_2$, $OCH_2CH_3$), 3.5-4.1 (br, $OCH_2CH_3$), 4.1-5.4 (br, OCH($CH_3)_2$, Si—H), 5.65-6.4 (br, CH=$CH_2$).

A reaction rate of 1,3-divinyltetramethyldisiloxane turned out to be 47% from $^1$H-NMR.

Additionally, an unreacted or generated alkoxysilyl group such as isopropoxysilyl group and ethoxysilyl group were observed in polysiloxane (P6). The analysis values are shown in Table 2.

From Mn described in Table 1 and a molar ratio of each structural unit described in Table 2, an average number of each structural unit contained in one molecule of polysiloxane was acquired and shown in Table 3.

Heat resistance was then evaluated using TG/DTA in the same manner as Example 1. The result was shown in Table 4.

Example 7

Except that 9.86 g (60 mmol) of triethoxysilane, 8.89 g (60 mmol) of trimethoxyvinylsilane, 29.93 g (249 mmol) of dimethoxydimethylsilane, 36.40 g (271 mmol) of 1,1,3,3-tetramethyldisiloxane, 192.09 g of 2-propanol, 384.18 g of xylene, and 20.61 g of 1.28% hydrochloric acid were used, 42.28 g of a slightly pale yellow liquid (hereinafter referred to as "polysiloxane (P7)") was obtained in the same manner as Example 1. This polysiloxane (P7) was measured for Mn, and the result was 700. In addition, viscosity at 25° C. was measured, and the result was 13 mPa·s.

Analytical results of $^1$H-NMR for the polysiloxane (P7) were as follows.

$^1$H-NMR ($C_6D_6$, δ (ppm): −0.2-0.6 (br, Si—$CH_3$), 0.9-1.5 (br, OCH($CH_3)_2$, $OCH_2CH_3$), 3.5-4.1 (br, $OCH_2CH_3$), 4.1-5.5 (br, OCH($CH_3)_2$, Si—H), 5.7-6.4 (br, CH=$CH_2$).

A reaction rate of 1,1,3,3-tetramethyldisiloxane turned out to be 45% from $^1$H-NMR.

Additionally, an unreacted or generated alkoxysilyl group such as isopropoxysilyl group and ethoxysilyl group were observed in polysiloxane (P7). The ratio of the alkoxysilyl group (alkoxy group) can be also acquired from $^1$H-NMR. The analysis values are shown in Table 2.

From Mn described in Table 1 and a molar ratio of each structural unit described in Table 2, an average number of each structural unit contained in one molecule of polysiloxane was acquired and shown in Table 3.

Heat resistance was then evaluated using TG/DTA in the same manner as Example 1. The result was shown in Table 4.

Example 8

Except that 49.28 g (300 mmol) of triethoxysilane, 29.65 g (200 mmol) of trimethoxyvinylsilane, 0.048 g (0.4 mmol) of dimethoxydimethylsilane, 0.42 g (3.1 mmol) of 1,1,3,3-tetramethyldisiloxane, 116.01 g of 2-propanol, 232.02 g of xylene, and 27.51 g of 1.28% hydrochloric acid were used, 33.76 g of a substantially colorless and sticky material (hereinafter referred to as "polysiloxane (P8)") was obtained in the same manner as Example 1. This polysiloxane (P8) was measured for Mn, and the result was 1,300. Viscosity at 25° C. could not be measured.

Analytical results of $^1$H-NMR for the polysiloxane (P8) were as follows.

$^1$H-NMR ($C_6D_6$, δ (ppm): −0.2-0.6 (br, Si—$CH_3$), 0.9-1.5 (br, OCH ($CH_3)_2$, $OCH_2CH_3$), 3.5-4.1 (br, $OCH_2CH_3$), 4.1-5.5 (br, OCH($CH_3)_2$, Si—H), 5.7-6.4 (br, CH=$CH_2$).

A reaction rate of 1,1,3,3-tetramethyldisiloxane turned out to be 64% from $^1$H-NMR.

Additionally, an unreacted or generated alkoxysilyl group such as isopropoxysilyl group and ethoxysilyl group were observed in polysiloxane (P8). The ratio of the alkoxysilyl group (alkoxy group) can be also acquired from $^1$H-NMR. The analysis values are shown in Table 2.

From Mn described in Table 1 and a molar ratio of each structural unit described in Table 2, an average number of each structural unit contained in one molecule of polysiloxane was acquired and shown in Table 3.

Heat resistance was then evaluated using TG/DTA in the same manner as Example 1. The result was shown in Table 4.

Comparative Example 1

Except that 246.41 g (1,500 mmol) of triethoxysilane, 74.12 g (500 mmol) of trimethoxyvinylsilane, 67.16 g (500 mmol) of 1,1,3,3-tetramethyldisiloxane, 500 g of 2-propanol, 1,000 g of toluene, and 136.90 g of 1.28% hydrochloric acid were used, 154.60 g of a substantially colorless liquid (hereinafter referred to as "polysiloxane (C1)") was obtained in the same manner as Example 1. This polysiloxane (C1) was measured for Mn, and the result was 1,700. In addition, viscosity at 25° C. was measured, and the result was 522 mPa·s (See Table 1).

Analytical results of $^1$H-NMR for the polysiloxane (C1) were as follows.

$^1$H-NMR ($C_6D_6$, δ (ppm): −0.2-0.6 (br, Si—$CH_3$), 0.9-1.5 (br, OCH($CH_3)_2$, $OCH_2CH_3$), 3.5-4.1 (br, $OCH_2CH_3$), 4.1-5.5 (br, OCH($CH_3)_2$, Si—H), 5.65-6.5 (br, CH=$CH_2$).

A reaction rate of 1,1,3,3-tetramethyldisiloxane turned out to be 45% from $^1$H-NMR.

Additionally, an unreacted or generated alkoxysilyl group such as isopropoxysilyl group and ethoxysilyl group were observed in polysiloxane (C1). The analysis values are shown in Table 2.

From Mn described in Table 1 and a molar ratio of each structural unit described in Table 2, an average number of each structural unit contained in one molecule of polysiloxane was acquired and shown in Table 3.

Subsequently, the obtained polysiloxane was used to produce a cured material of polysiloxane under two types of curing conditions and evaluation thereof was conducted in the same manner as Example 1.

The above-mentioned polysiloxane (not containing a catalyst for the hydrosilylation reaction) was applied on a glass plate using a bar coater, and then the polysiloxane was heated and cured at a temperature of 130° C. for 4 hours to form a cured material (cured film) having a thickness of approximately 10 μm. No generation of a crack was found at this time. This cured material was evaluated using the TG/DTA, and the result was that the 5% weight loss temperature of the cured material at a temperature rising rate of 20° C./minute under a nitrogen gas atmosphere was 670° C., and the 5% weight loss temperature under the air atmosphere was 890° C. These results are shown in Table 4.

On the other hand, the above polysiloxane (not containing a catalyst for the hydrosilylation reaction) was applied on a steel plate (SPCC-SD) using a bar coater and then the polysiloxane was heated at a temperature of 130° C. for 4 hours. It was further heated at 170° C. for 4 hours or at 200° C. for 1 hour and cured to form a cured material (cured film) having a thickness of approximately 10 μm. A crack was generated in this cured material. The evaluation results are shown in Table 4.

Comparative Example 2

Except that 24.64 g (150 mmol) of triethoxysilane, 22.23 g (150 mmol) of trimethoxyvinylsilane, 15.93 g (150 mmol) of dimethoxymethylsilane, 76.29 g of 2-propanol, 259.95 g of xylene, and 21.90 g of 1.28% hydrochloric acid were used, 28.52 g of a substantially colorless highly viscous liquid (hereinafter referred to as "polysiloxane (C2)") was obtained in the same manner as Example 1. This polysiloxane (C2) was measured for Mn, and the result was 1,700. In addition, viscosity at 25° C. was measured, and the result was 31,700 mPa·s (See Table 1).

Analytical results of $^1$H-NMR for the polysiloxane (C2) were as follows.

$^1$H-NMR ($C_6D_6$, δ (ppm): −0.2-0.7 (br, Si—$CH_3$), 0.9-1.5 (br, OCH($CH_3$)$_2$, O$CH_2CH_3$), 3.5-4.1 (br, O$CH_2$CH$_3$), 4.1-5.7 (br, OCH($CH_3$)$_2$, Si—H), 5.7-6.6 (br, CH=$CH_2$).

An unreacted or generated alkoxysilyl group such as isopropoxysilyl group and ethoxysilyl group were observed in polysiloxane (C2). The analysis values are shown in Table 2.

From Mn described in Table 1 and a molar ratio of each structural unit described in Table 2, an average number of each structural unit contained in one molecule of polysiloxane was acquired and shown in Table 3.

Heat resistance was then evaluated using TG/DTA in the same manner as Comparative Example 1. The result was shown in Table 4.

Comparative Example 3

Except that 49.28 g (300 mmol) of triethoxysilane, 35.58 g (240 mmol) of trimethoxyvinylsilane, 144.39 g of 2-propanol, 513.84 g of xylene, and 29.57 g of 1.28% hydrochloric acid were used, 38.61 g of a substantially colorless highly viscous liquid (hereinafter referred to as "polysiloxane (C3)") was obtained in the same manner as Example 1. This polysiloxane (C3) was measured for Mn, and the result was 1,200. In addition, viscosity at 25° C. was measured, and the result was 281,000 mPa·s (See Table 1).

Analytical results of $^1$H-NMR for the polysiloxane (C3) were as follows.

$^1$H-NMR ($C_6D_6$, δ (ppm): 0.7-1.5 (br, OCH($CH_3$)$_2$, O$CH_2CH_3$), 3.5-4.1 (br, O$CH_2$CH$_3$), 4.1-5.5 (br, OCH($CH_3$)$_2$, Si—H), 5.6-6.5 (br, CH=$CH_2$).

An unreacted or generated alkoxysilyl group such as isopropoxysilyl group and ethoxysilyl group were observed in polysiloxane (C3). The analysis values are shown in Table 2.

From Mn described in Table 1 and a molar ratio of each structural unit described in Table 2, an average number of each structural unit contained in one molecule of polysiloxane was acquired and shown in Table 3.

Heat resistance was then evaluated using TG/DTA in the same manner as Comparative Example 1. The result was shown in Table 4.

TABLE 1

| | | Charged amount of silicon compound (molar ratio) | | | | | | | | |
|---|---|---|---|---|---|---|---|---|---|---|
| | | Silicon compound (T) | | Silicon compound (D) | | Silicon compound (M) | | Polysiloxane | | |
| | | Triethoxy silane | Trimethoxy vinyl silane | Trimethoxy (4-vinylphenyl) silane | Dimethoxy methysilane | Dimethoxy dimethyl silane | 1,1,3,3-Tetramethyl disiloxane | 1,3-Divinyl tetramethyl disiloxane | Type | Structural unit contained in polysiloxane | Mn | Viscosity (mPa · s) |
| Example | 1 | 3 | 1 | — | — | 0.48 | 1 | — | P1 | M, D, T | 1300 | 43 |
| | 2 | 3 | 1 | — | — | 0.2 | 1 | — | P2 | M, D, T | 1100 | 34 |
| | 3 | 3 | 0.85 | 0.15 | — | 0.48 | 0.8 | — | P3 | M, D, T | 1200 | 93 |
| | 4 | 4 | — | — | 0.48 | — | — | 1 | P4 | M, D, T | 1800 | 549 |
| | 5 | 4 | — | — | 1 | — | — | 1 | P5 | M, D, T | 1800 | 195 |
| | 6 | 4 | — | — | 1.5 | — | — | 1 | P6 | M, D, T | 1500 | 67 |
| | 7 | 1 | 1 | — | — | 4.15 | 4.52 | — | P7 | M, D, T | 700 | 13 |
| | 8 | 1.5 | 1 | — | — | 0.002 | 0.031 | — | P8 | M, D, T | 1300 | — |
| Comparative Example | 1 | 3 | 1 | — | — | — | 1 | — | C1 | M, T | 1700 | 522 |
| | 2 | 1 | 1 | — | 1 | — | — | — | C2 | D, T | 1700 | 31700 |
| | 3 | 5 | 4 | — | — | — | — | — | C3 | T | 1200 | 281000 |

1,1,3,3-tetramethyldisiloxane and 1,3-divinyltetramethyldisiloxane described in the "silicon compound (M)" in Table 1 have two silicon atoms in the molecule, and when a charged amount is 1 mol (molar ratio), 2 mol of the structural unit M in Table 2 and the like is formed.

TABLE 2

| | | Polysiloxane | Composition of polysiloxane (molar ratio of structural units) | | | | | | | | |
|---|---|---|---|---|---|---|---|---|---|---|---|
| | | | Molar ratio of structural units formed by hydrolysis and condensation of silicon compound | | | | | | | Molar ratio of non-reacted or generated alkoxy group | |
| | | | Structural unit T | | | Structural unit D | | Structural unit M | | | |
| | | | $HSiO_{3/2}$ | $ViSiO_{3/2}$ | $ViPhSiO_{3/2}$ | $H(Me)SiO_{2/2}$ | $Me_2SiO_{2/2}$ | $H(Me)_2SiO_{1/2}$ | $Vi(Me)_2SiO_{1/2}$ | $iPrO_{1/2}$ | $EtO_{1/2}$ |
| Example | 1 | P1 | 3 | 1 | 0 | 0 | 0.48 | 1.11 | 0 | 0.30 | 0.05 |
| | 2 | P2 | 3 | 1 | 0 | 0 | 0.2 | 1.28 | 0 | 0.38 | 0.08 |
| | 3 | P3 | 3 | 0.85 | 0.15 | 0 | 0.48 | 1.03 | 0 | 0.35 | 0.07 |
| | 4 | P4 | 4 | 0 | 0 | 0.48 | 0 | 0 | 0.79 | 0.24 | 0.05 |
| | 5 | P5 | 4 | 0 | 0 | 1 | 0 | 0 | 0.76 | 0.27 | 0.05 |
| | 6 | P6 | 4 | 0 | 0 | 1.5 | 0 | 0 | 0.94 | 0.28 | 0.05 |
| | 7 | P7 | 1 | 1 | 0 | 0 | 4.15 | 4.1 | 0 | 0.15 | 0.05 |
| | 8 | P8 | 1.5 | 1 | 0 | 0 | 0.002 | 0.02 | 0 | 0.25 | 0.05 |
| Comparative Example | 1 | C1 | 3 | 1 | 0 | 0 | 0 | 0.90 | 0 | 0.25 | 0.05 |
| | 2 | C2 | 1 | 1 | 0 | 1 | 0 | 0 | 0 | 0.08 | 0.01 |
| | 3 | C3 | 5 | 4 | 0 | 0 | 0 | 0 | 0 | 0.75 | 0.21 |

Vi: vinyl group,
Ph: phenylene group,
Me: methyl group,
Et: ethyl group,
iPr: isopropyl group In Table 2, the molar ratios of the structural unit T and the structural unit D are values assuming that corresponding compounds react stoichiometrically. The molar ratios of the structural unit M and the alkoxy group were calculated from data of $^1$H-NMR analysis. That is, the molar ratios of the structural unit M and the alkoxy group were acquired from an area ratio of a peak deriving from the vinyl group in the structural unit T and a peak deriving from the methyl group in each unit for Examples 1 to 3, 7 and 8 as well as Comparative Examples 1 to 3. Additionally, the molar ratio was acquired from an area ratio of a peak deriving from the methyl group in the structural unit D and a peak deriving from the methyl group in each unit for Examples 4 to 6.

TABLE 4

| | | | Evaluation of polysiloxane cured material | | | | | | | |
|---|---|---|---|---|---|---|---|---|---|---|
| | | | Heat resistance of cured material (5% weight loss temperature) | | | | Appearance and adhesiveness of cured film | | | |
| | | | Curing condition 130° C. × 4 h | | Curing condition 130° C. × 4 h → 400° C. | | Curing condition 130° C. × 4 h + 170° C. × 4 h | | Curing condition 130° C. × 4 h + 200° C. × 1 h | |
| | | Polysiloxane | in air | in $N_2$ | in air | in $N_2$ | Appearance | Adhesiveness | Appearance | Adhesiveness |
| Example | 1 | P1 | ≧1000° C. | ≧1000° C. | ≧1000° C. | ≧1000° C. | ○ | 100/100 | ○ | 100/100 |
| | 2 | P2 | ≧1000° C. | ≧1000° C. | ≧1000° C. | ≧1000° C. | ○ | 100/100 | ○ | 100/100 |
| | 3 | P3 | ≧1000° C. | ≧1000° C. | ≧1000° C. | ≧1000° C. | ○ | 100/100 | ○ | 100/100 |
| | 4 | P4 | ≧1000° C. | ≧1000° C. | ≧1000° C. | ≧1000° C. | ○ | 100/100 | ○ | 100/100 |
| | 5 | P5 | ≧1000° C. | ≧1000° C. | ≧1000° C. | ≧1000° C. | ○ | 100/100 | ○ | 100/100 |
| | 6 | P6 | ≧1000° C. | ≧1000° C. | ≧1000° C. | ≧1000° C. | ○ | 100/100 | ○ | 100/100 |
| | 7 | P7 | 950° C. | ≧1000° C. | ≧1000° C. | ≧1000° C. | ○ | 100/100 | ○ | 100/100 |
| | 8 | P8 | 910° C. | ≧1000° C. | 950° C. | ≧1000° C. | X | No data | X | No data |
| Comparative Example | 1 | C1 | 890° C. | 670° C. | No data | No data | X | No data | X | No data |
| | 2 | C2 | 640° C. | 880° C. | No data | No data | X | No data | X | No data |
| | 3 | C3 | 630° C. | ≧1000° C. | No data | No data | X | No data | X | No data |

TABLE 3

Composition of polysiloxane (average number of structural unit cantained in one molecule of polysiloxane)

$$(H-SiO_{3/2})_v \ (A-(R^1)_n-SiO_{3/2})_w \begin{pmatrix} R^2 \\ | \\ SiO_{2/2} \\ | \\ R^2 \end{pmatrix}_x \begin{pmatrix} R^4 \\ | \\ R^3-SiO_{1/2} \\ | \\ R^4 \end{pmatrix}_y (R^5O_{1/2})_z$$

| | | Polysiloxane | Molar ratio of structural units formed by hydrolysis and condensation of silicon compound | | | | | | Molar ratio of non-reacted or generated | | Relationship between v, w, x, y and z | | |
|---|---|---|---|---|---|---|---|---|---|---|---|---|---|
| | | | Structural unit T | | | Structural unit D | | Structural unit M | | alkoxy group | | | | |
| | | | $HSiO_{3/2}$ v | $ViSiO_{3/2}$ | $ViPhSiO_{3/2}$ w | $H(Me)SiO_{2/2}$ | $Me_2SiO_{2/2}$ x | $H(Me)_2SiO_{1/2}$ | $Vi(Me)_2SiO_{1/2}$ y | $iPrO_{1/2}$ | $EtO_{1/2}$ z | $x/(v+w)$ | $y/(v+w)$ | $z/(v+w+x+y)$ |
| Example | 1 | P1 | 10.8 | 3.6 | 0 | 0 | 1.8 | 3.9 | 0 | 1.0 | 0.2 | 0.13 | 0.27 | 0.080 |
| | 2 | P2 | 9.1 | 3.1 | 0 | 0 | 0.6 | 3.9 | 0 | 1.1 | 0.2 | 0.05 | 0.32 | 0.078 |
| | 3 | P3 | 9.5 | 2.7 | 0.5 | 0 | 1.5 | 3.2 | 0 | 1.2 | 0.2 | 0.12 | 0.25 | 0.080 |
| | 4 | P4 | 22.8 | 0 | 0 | 2.7 | 0 | 0 | 4.4 | 1.4 | 0.3 | 0.12 | 0.19 | 0.054 |
| | 5 | P5 | 20.7 | 0 | 0 | 5.1 | 0 | 0 | 3.9 | 1.4 | 0.2 | 0.25 | 0.19 | 0.054 |
| | 6 | P6 | 15.3 | 0 | 0 | 5.8 | 0 | 0 | 3.7 | 1.2 | 0.2 | 0.38 | 0.24 | 0.056 |
| | 7 | P7 | 1 | 1 | 0 | 0 | 4.15 | 4.1 | 0 | 0.075 | 0.025 | 2.08 | 2.05 | 0.010 |
| | 8 | P8 | 1.5 | 1 | 0 | 0 | 0.002 | 0.02 | 0 | 0.25 | 0.05 | 0.0008 | 0.008 | 0.119 |
| Comparative Example | 1 | C1 | 16.3 | 5.4 | 0 | 0 | 0 | 4.8 | 0 | 1.3 | 0.3 | 0 | 0.22 | 0.060 |
| | 2 | C2 | 8.7 | 8.6 | 0 | 8.8 | 0 | 0 | 0 | 0.7 | 0.1 | 0.51 | 0 | 0.031 |
| | 3 | C3 | 9.5 | 7.6 | 0 | 0 | 0 | 0 | 0 | 1.4 | 0.4 | 0 | 0 | 0.105 |

Vi: vinyl group, Ph: phenylene group, Me: methyl group, Et: ethyl group, iPr. isopropyl group In Table 4, "O" represents that a crack was not observed and "X" represents that a crack was observed.

INDUSTRIAL APPLICABILITY

The polysiloxane of the present invention is useful for the formation of a heat-resistant film. Since the heat-resistant film obtained by curing the polysiloxane has favorable characteristics in water resistance, chemical resistance, stability, electric insulation and mechanical strength such as abrasion resistance, the film can be used as a film or a layer of articles, components and the like in a wide variety of fields including electronics, optical functional materials, aerospace and the like. The film can be used as a passivation film, resist film, inter-layer insulating film in a semiconductor, or the like and also can be used as various protective films.

What is claimed is:

1. A polysiloxane obtained by conducting a hydrolysis and polycondensation reaction of a silicon compound (T) having three hydrolyzable groups, a silicon compound (D) having two hydrolyzable groups, and a silicon compound (M) having one hydrolyzable group,
wherein at least one compound of said silicon compound (T), said silicon compound (D), and said silicon compound (M) has a hydrosilyl group,
wherein at least one compound of said silicon compound (T), said silicon compound (D), and said silicon compound (M) has a hydrosilylatable carbon-carbon unsaturated group,
wherein said polysiloxane has a hydrosilylatable carbon-carbon unsaturated group, a hydrosilyl group and an alkoxysilyl group, and has a number average molecular weight of 500 to 20,000,
wherein said polysiloxane comprises a unit represented by formula (I):

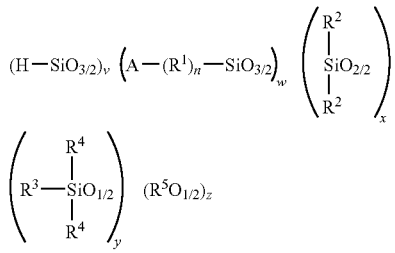

(1)

wherein A is an organic group having 2 to 10 carbon atoms containing a hydrosilylatable carbon-carbon unsaturated group, $R^1$ is an alkylene group having 1 to 20 carbon atoms, a divalent aromatic group having 6 to 20 carbon atoms or a divalent alicyclic group having 3 to 20 carbon atoms, n is 0 or 1, $R^2$ is a hydrogen atom, an alkyl group having 1 to 10 carbon atoms or an organic group having 2 to 10 carbon atoms containing a hydrosilylatable carbon-carbon unsaturated group (each $R^2$ in one molecule may be the same or different), $R^3$ is a hydrogen atom or an organic group having 2 to 10 carbon atoms containing a hydrosilylatable carbon-carbon unsaturated group, $R^4$ is a hydrogen atom, an alkyl group having 1 to 10 carbon atoms or an organic group having 2 to 10 carbon atoms containing a hydrosilylatable carbon-carbon unsaturated group (each $R^4$ in one molecule may be the same or different), $R^5$ is an alkyl group having 1 to 6 carbon atoms, v is 5-100, w is 0-40, x is 0.1-40, y is 0.1-50 and z is 0.1-20, and
wherein $0.001 \leq x/(v+w) \leq 2$, $0.01 \leq y/(v+w) \leq 2$, and $0.01 \leq z/(v+w+x+y) \leq 1$, whereby, when w is zero, at least one of $R^2$, $R^3$ and $R^4$ is an organic group having 2 to 10 carbon atoms containing a hydrosilylatable carbon-carbon unsaturated group.

2. A method for the production of a polysiloxane according to claim 1, comprising
    first hydrolyzing and polycondensing a silicon compound (T) having three hydrolyzable groups, a silicon compound (D) having two hydrolyzable groups, and a silicon compound (M) having one hydrolyzable group in the presence or absence of an organic solvent,
    wherein at least one compound of said silicon compound (T), said silicon compound (D), and said silicon compound (M) has a hydrosilyl group, and
    wherein at least one compound of said silicon compound (T), said silicon compound (D), and said silicon compound (M) has a hydrosilylatable carbon-carbon unsaturated group.

3. The method for the production of a polysiloxane according to claim 2,
    wherein said hydrolyzable group in said silicon compound (T) is an alkoxy group,
    wherein said hydrolyzable group in said silicon compound (D) is an alkoxy group, and
    wherein said hydrolyzable group in said silicon compound (M) is an alkoxy group or a siloxy group.

4. The method for the production of the polysiloxane according to claim 3, further comprising
    distilling water in the presence of an aromatic hydrocarbon having a boiling point of 90° C. or higher after said first hydrolyzing and polycondensing.

5. The method for the production of a polysiloxane according to claim 2, further comprising
    distilling water in the presence of an aromatic hydrocarbon having a boiling point of 90° C. or higher after said first hydrolyzing and polycondensing.

6. A method for the production of a cured material of polysiloxane, comprising heating the polysiloxane according to claim 1 at a temperature range from 150° C. to 700° C. in the absence of a catalyst for hydrosilylation reaction.

7. A method for the production of a cured material of polysiloxane, comprising heating the polysiloxane according to claim 1 at a temperature range from 150° C. to 700° C. in the absence of a catalyst for hydrosilylation reaction.

8. A method for the production of a cured material of polysiloxane, comprising
    heating the polysiloxane according to claim 1 at a temperature of 50° C. or higher and lower than 150° C. in the absence of a catalyst for hydrosilylation reaction; and
    heating at a temperature range from 150° C. to 700° C., sequentially.

9. A method for the production of a cured material of polysiloxane, comprising
    heating the polysiloxane according to claim 1 at a temperature of 50° C. or higher and lower than 150° C. in the absence of a catalyst for hydrosilylation reaction; and
    heating at a temperature range from 150° C. to 700° C., sequentially.

* * * * *